(12) United States Patent
Greenbaum et al.

(10) Patent No.: US 7,436,991 B2
(45) Date of Patent: Oct. 14, 2008

(54) IMAGE BUFFERS AND ACCESS SCHEDULES FOR IMAGE RECONSTRUCTION SYSTEMS

(75) Inventors: Steven Greenbaum, Palo Alto, CA (US); Lee A. Barford, San Jose, CA (US); Stanley T. Jefferson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 777 days.

(21) Appl. No.: 10/651,378

(22) Filed: Aug. 29, 2003

(65) Prior Publication Data

US 2005/0047637 A1    Mar. 3, 2005

(51) Int. Cl.
G06K 9/00 (2006.01)
(52) U.S. Cl. .................................... 382/128
(58) Field of Classification Search .............. 378/21, 378/41; 382/128, 131, 132, 154, 285
See application file for complete search history.

(56) References Cited

U.S. PATENT DOCUMENTS

| 4,926,452 | A | | 5/1990 | Baker et al. |
| 5,020,086 | A | * | 5/1991 | Peugeot .................. 378/113 |
| 5,583,904 | A | * | 12/1996 | Adams .................... 378/22 |
| 5,644,612 | A | * | 7/1997 | Moorman et al. ........ 378/98.2 |
| 6,002,739 | A | | 12/1999 | Heumann |
| 6,178,223 | B1 | | 1/2001 | Solomon et al. |
| 6,201,850 | B1 | | 3/2001 | Heumann |

OTHER PUBLICATIONS

U.S. Appl. No. 10/643,728, Jefferson.
Smith, Bruce D., "Cone-beam tomography: recent advances and a tutorial review", Optical Engineering, vol. 29, No. 5, May 1990, pp. 524-534.
Jacobson, Caroline, "Fourier Methods in 3D-Reconstruction from Cone-Beam Data", Abstract only on Dissertation No. 427, Linkoping University (Sweden), [online] [Retrieved on Aug. 13, 2003]. 2 pages.
Censor, Yair, "Finite Series-Expansion Reconstruction Methods", IEEE, vol. 71, No. 3, Mar. 1983, pp. 409-419.
Lewitt, Robert M., "Reconstruction Algorithms: Transform Methods", IEEE, vol. 71, No. 3, Mar. 1983, pp. 390-408.
Louis, Alfred K. et al., "Mathematical Problems of Computerized Tomography", IEEE vol. 71, No. 3, Mar. 1983, pp. 379-389.

* cited by examiner

Primary Examiner—Tom Y Lu

(57) ABSTRACT

A system and method utilize data buffers and data access schedules to improve handling of captured image data of an object under inspection for tomosynthetically processing such captured image data to reconstruct desired cross-sectional images therefrom. One embodiment implements a data buffer communicatively coupled to a radiographic imaging system that allows for storage of captured radiographic image data for at least a portion of multiple different projections of an object under inspection, such as image data associated with one or more angles of view of one or more different regions of the object, and then later that stored data may be used for tomosynthetically reconstructing cross-sectional images for the object under inspection.

21 Claims, 18 Drawing Sheets

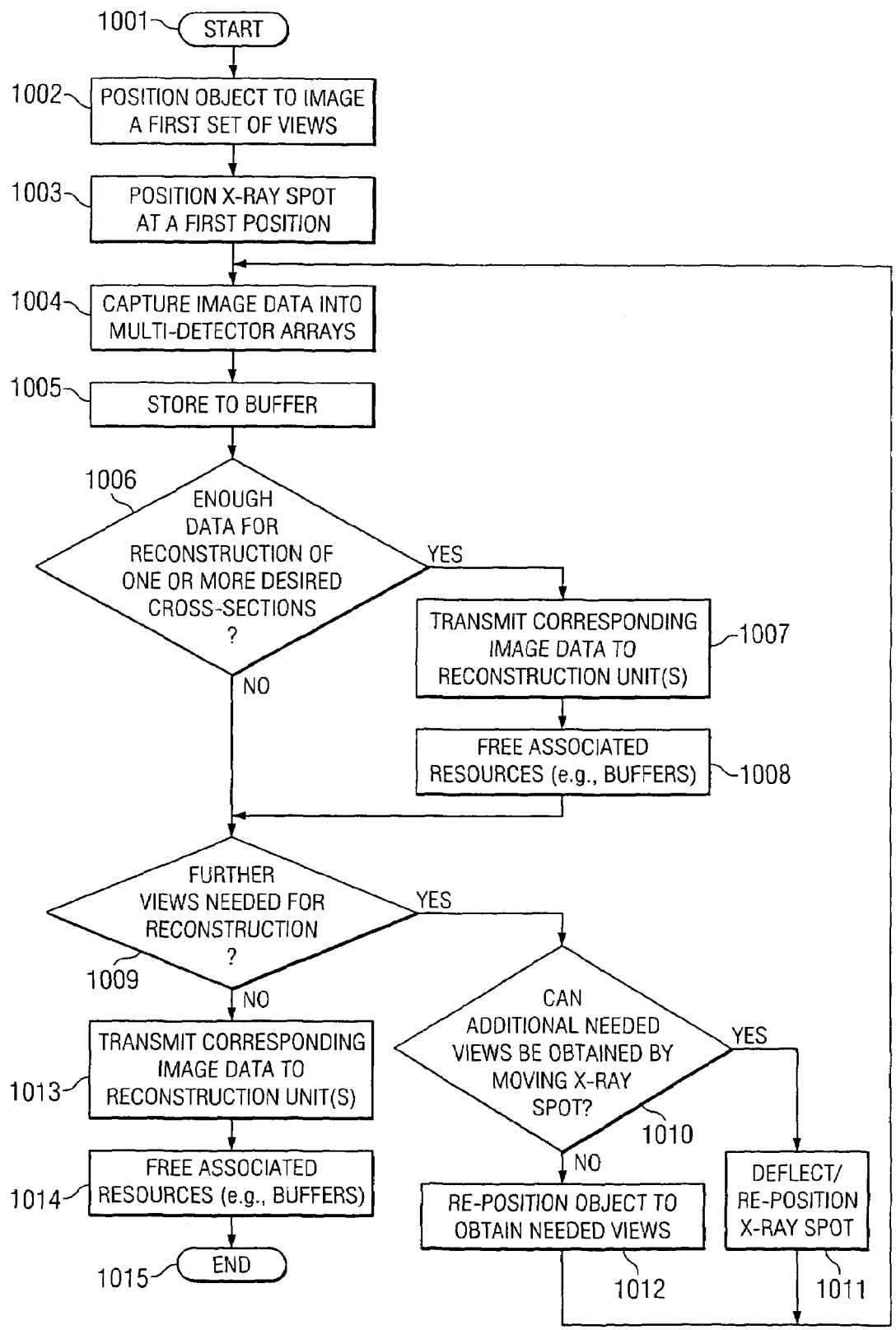

*FIG. 12*
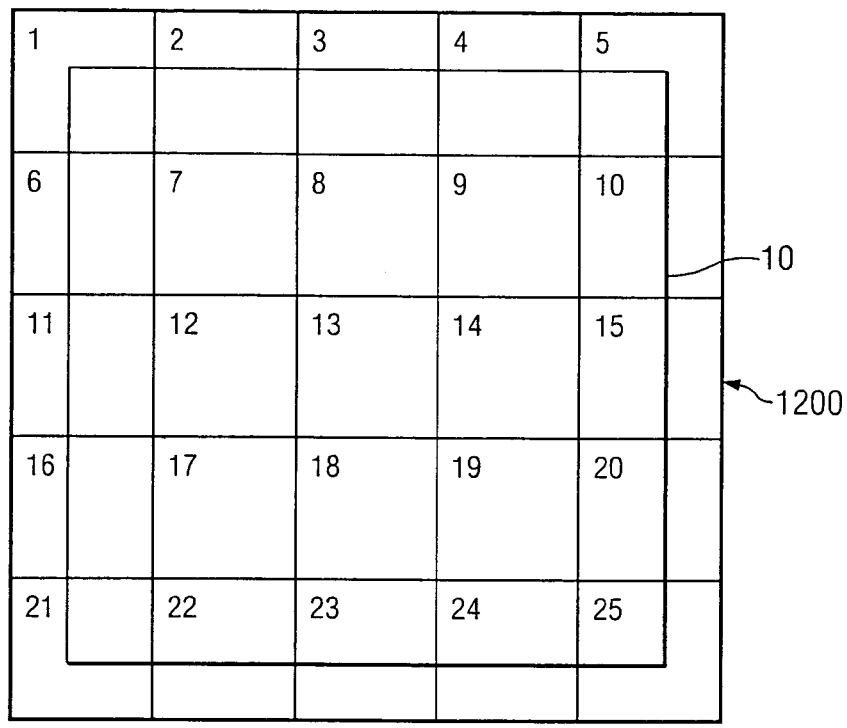
*FIG. 13*
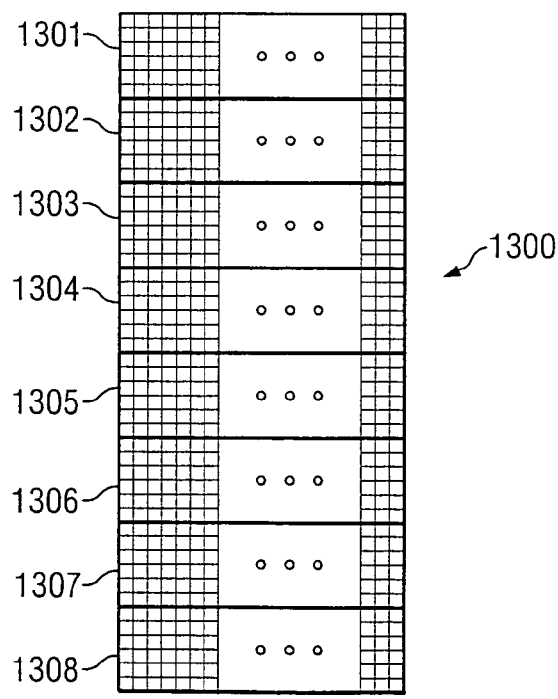
*FIG. 14*
| COUNT | BUFFER_START |
|---|---|
| $C_1$ | $B_1$ |
| $C_2$ | $B_2$ |
| $C_3$ | $B_3$ |
| $C_4$ | $B_4$ |
| $C_5$ | $B_5$ |
| ⋮ | ⋮ |

IMAGE BUFFERS AND ACCESS SCHEDULES FOR IMAGE RECONSTRUCTION SYSTEMS

TECHNICAL FIELD

The present invention relates in general to image processing, and more particularly to a system and method for reconstructing cross-sectional images of an object from radiographic images of the object.

BACKGROUND OF THE INVENTION

The technique of reconstructing a cross-sectional image of an object from multiple projections is broadly referred to as tomography. When such reconstructing of a cross-sectional image is performed with the aid of a processor-based device (or "computer"), the technique is broadly referred to as computed (or computerized) tomography (CT). In a typical example application, a radiation source projects X-wavelength radiation through an object onto an electronic sensor (or "detector") array. By providing relative movement between one or more of the object, the source, and the sensor array, multiple views are obtained. An image of a slice through the object or a three-dimensional ("3D") image of the object may then be approximated by use of proper mathematical transforms of the multiple views. That is, cross-sectional images of an object may be reconstructed, and in certain applications such cross-sectional images may be combined to form a full 3D image of the object.

Perhaps the best known practical application of tomography is the medical computerized tomography scanner (CT Scanner, also called computer-aided tomography or computerized axial tomography (CAT)). For instance, cross-sectional image reconstruction from radiographic (e.g., X-ray) images is commonly used in medical applications to generate a cross-sectional image (and/or 3D view) of the human body or part of the human body from X-ray images. In those applications, speed of reconstruction of the cross-sectional images has not traditionally been very important. However, as medical procedures continue to evolve, certain medical applications are beginning to desire fast reconstruction of cross-sectional images. For instance, real-time X-ray imaging is increasingly being desired by medical procedures, such as many electro-physiologic cardiac procedures, peripheral vascular procedures, percutaneous transluminal catheter angioplasty (PTCA) procedures, urological procedures, and orthopedic procedures, as examples.

Tomography is also of interest in automated inspection of industrial products. For instance, reconstruction of cross-sectional images from radiographic (e.g., X-ray) images has been utilized in quality control inspection systems for inspecting a manufactured product, such as electronic devices (e.g., printed circuit board assemblies). That is, tomography may be used in an automated inspection system to reconstruct images of one or more planes (which may be referred to herein as "depth layers" or "cross-sections") of an object under study in order to evaluate the quality of the object (or portion thereof). For instance, a printed circuit board assembly (or other object under study) may comprise various depth layers of interest for inspection. As a relatively simple example, a dual-sided printed circuit board assembly may comprise solder joints on both sides of the board. Thus, each side of the circuit board assembly on which the solder joints are arranged may comprise a separate depth layer of the board. Further, the circuit board assembly may comprise surface mounts (e.g., a ball grid array of solder) on each of its sides, thus resulting in further depth layers of the board that may be of interest.

The object under inspection may be imaged from various different angles of view (e.g., by exposure to X-rays at various different angles) resulting in radiographic images of the object, and such radiographic images may be processed to reconstruct an image of a depth layer (or "slice") of the object. That is, X-rays may be applied from an X-ray source to an object under inspection at various different angles of view, and detectors arranged on the side of the object opposite the X-ray source may receive the X-rays and measure the X-ray transmissiveness of the object. Such measurement information may be output by the radiographic imaging device as digital information (e.g., data representing "pixels" of the object). Such radiographic image data (pixels) may be input to an image reconstructor, which uses the information to reconstruct cross-sectional images of the object under inspection. Thereafter, the resulting cross-sectional images may, in some inspection systems, be displayed layer by layer, and/or such cross-sectional images may be used to reconstruct a full 3D visualization of the object under inspection.

Automated inspection systems that provide reconstruction of cross-sectional images of an object under inspection from radiographic (e.g., X-ray) images captured for such object have been unable to provide quality analysis quickly enough to keep up with high beat-rate production lines. Because of cost, speed, and/or the mechanics required to obtain multiple radiographic images (e.g., images at various different angles) and compute several cross-sectional images, many of the traditional approaches to tomography (such as those traditionally used for medical applications that do not require fast reconstruction) are not suitable for a manufacturing environment. For example, a printed circuit board assembly line generally moves very fast. For instance, printed circuit boards may be spaced merely seconds apart on a production line, and therefore, to implement an automated X-ray inspection system in a production setting, such inspection system needs to be very fast. Ideally, the inspection process is in real time, as part of a feedback control system for the manufacturing process. In some manufacturing environments there is a need to verify the integrity of tens of thousands of solder joints within one minute or less. Typically, current automated X-ray inspection systems limit the speed at which a production line may operate, and thus automated X-ray inspection systems are currently primarily used for inspecting relatively specialized, high-cost boards that are typically manufactured in relatively low quantities, wherein speed of the manufacturing line is not so important. Of course, automated X-ray inspection systems would likely be used more often if they could operate fast enough to keep up with high-throughput production lines.

Within X-ray absorption tomography, a number of imaging techniques are applicable to reconstruction of cross-sectional slices. One imaging technique is known as laminography. In laminography, the X-ray source and detector array are moved in a coordinated fashion relative to the object to be viewed so that portions of an object outside a selected focal plane lead to a blurred image at the detector array (see, for example, U.S. Pat. No. 4,926,452). Focal plane images are reconstructed in an analog averaging process. An example of a laminography system that may be utilized for electronics inspection is described further in U.S. Pat. No. 6,201,850 entitled "ENHANCED THICKNESS CALIBRATION AND SHADING CORRECTION FOR AUTOMATIC X-RAY INSPECTION."

Another imaging technique is known as tomosynthesis. Tomosynthesis is an approximation to laminography in which multiple projections (or views) are acquired and combined. As the number of views increases, the resulting combined image generally approaches that obtained using laminography with the same geometry. A differentiating feature of tomosynthesis from the above-described laminographic technique is that in tomosynthesis X-ray images obtained from different directions (different angles of view) can be manipulated (e.g., overlapped with different spatial shifts and their brightness averaged) to produce a variety of cross-sections. In other words, one set of X-ray images can be used to obtain multiple cross-sections of an object under inspection (e.g., cross-sections of the object at different heights). Tomosynthesis may be performed as an analog method, for example, by superimposing sheets of exposed film. Tomosynthesis may, instead, be performed as a digital method. In digital tomosynthesis, the individual views are divided into pixels, and digitized and combined via computer software.

Three-dimensional (3D) computed tomography has the potential for more accurate image reconstruction than laminography or tomosynthesis, but at the expense of speed (computation time). Three-dimensional computed tomography typically requires many projections, and is computationally intensive. One approach to 3D computer-aided tomography is to position an X-ray source having a cone-shaped 3D ray output on one side of an object to be viewed, and to position a two-dimensional (2D) array of detectors (e.g., charged-coupled devices ("CCDs")) on the opposite side of the object to be viewed, and to synchronously move the source/array relative to the object. There are many suitable scan paths. For complete reconstruction of an arbitrary object, the scan path must surround the object. For example, the source may be moved around the object to be viewed, or the source may be moved along a helical path or other path along a cylinder surrounding the object to be viewed. This approach, called cone-beam tomography, is preferable in many cases for reconstructing 3D images, and is potentially preferable for electronic assembly analysis (e.g., for electronic assembly analysis) because of the resulting image quality.

A theoretical mathematical approach to reconstructing an object from its projections was developed by J. Radon in 1917, and the basic transforms are now referred to as Radon transforms. More recently, researchers have proposed various methods for cone-beam reconstruction. See, for example:

- A. K. Louis and F. Natterer, "Mathematical Problems of Computerized Tomography," *Proceedings of the IEEE*, Vol. 71, No. 3, pp 379-389 (March 1983);
- R. M. Lewitt, "Reconstruction Algorithms: Transform Methods," *Proceedings of the IEEE*, Vol. 71, No. 3, pp 390-408 (March 1983);
- Y. Censor, "Finite Series-Expansion Reconstruction Methods," *Proceedings of the IEEE*, Vol. 71, No. 3, pp 409-419 (March 1983);
- B. D. Smith, "Cone-beam tomography: recent advances and a tutorial review," *Optical Engineering*, Vol. 29 No. 5, pp 524-534 (May 1990); and
- C. Jacobson, "Fourier Methods in 3D-Reconstruction from Cone-Beam Data," Ph.D. Dissertation, Dissertation No. 427, Department of Electrical Engineering, Linkoping University, Linkoping, Sweden (1996).

In general, each of the above methods involves various trade-offs such as image quality (approximations, noise, blurring, and artifacts) versus computation time and difficulty of obtaining the required views.

The cone-beam methods typically result in a set of planar images. Some kind of rectangular detector array is typically used, which captures a set of pixels allocated on a plane instead of along a single line. Before development of the cone-beam methods, imaging techniques, such as the well-known fan-beam methods, acquired only one-dimensional ("1D") projections. With the cone-beam methods that utilize a detector array, 2D images are captured. The 2D images that are captured are comparable to those captured by digital cameras, wherein a matrix of pixels are acquired for an object being imaged. The captured 2D images may then be processed to combine them (e.g., using a Back Projection technique) to reconstruct the 3D object under inspection (or portion thereof).

Tomographic techniques, such as tomosynthesis or 3D computed tomography, typically require many 2D image projections (at many different angles of view), and are typically computationally intensive for reconstructing 3D images from the 2D image data. Accordingly, an undesirably large amount of data storage capacity may be required in a tomography system for storing the large amount of 2D image data (pixels) acquired, and the efficiency of processing the 2D image data for reconstructing the 3D image data becomes a concern.

Most radiographic imaging systems traditionally used for inspection are analog machines, such as those used for the above-described laminography techniques. Without substantial upgrades to these analog imaging systems, it is unlikely that they can achieve the image processing speed desired for high-throughput production environments. Accordingly, digital-based imaging systems, such as the above-described cone-beam tomography system, are beginning to be used within inspection systems. Digital-based imaging systems typically generate an enormous amount of image data that is to be managed and processed for performing reconstruction of cross-sectional images. Accordingly, a desire exists for a cost-effective technique that is capable of processing the image data from such a digital-based imaging system in an efficient manner.

Often, reconstruction of cross-sectional images of an object is performed incrementally for regions of the object. Generally, a "region" of an object is a portion that can be imaged at one time. For example, an entire circuit board assembly is typically not imaged at once by a radiographic imaging system because of constraints of the detector array, the X-ray source, etc., but rather the circuit board assembly is typically logically divided into regions for imaging one small portion of the board (e.g., a square inch area) at a time. Typically, radiographic images of a region of an object are acquired at various angles by an X-ray imaging system for reconstructing one or more cross-sectional images of the region. That is, images from various different angles of a region are combined together in some special way (e.g., using mathematical transforms) by an image reconstruction unit to result in reconstructed cross-sectional image(s) of the region. Acquiring the radiographic images of a region at the various angles is often a time consuming task because it involves moving one or more of the X-ray source, detector array, and object around to achieve the different angles of view.

It should be recognized that acquiring radiographic images of a region of an object at various different angles may result in acquisition of a substantial amount of radiographic image data for each region. Typically, reconstruction is performed incrementally as images of various views are collected, which avoids excessive storage of captured pixel data. Incremental systems consecutively produce all images for one region of an object that are needed for reconstructing a cross-sectional image of that region before producing images for another region. The images of a first region of an object are sequentially processed and the result accumulated into a reconstruction of that region (i.e., reconstruction of one or more cross-sectional images desired for that region), and that reconstruction is output (or stored) before beginning processing for another region of the object. System resources are then reused for reconstructing the desired cross-sections of the next region.

Accordingly, in traditional inspection systems, radiographic images are acquired and processed to reconstruct cross-sections for one region of an object under inspection at a time. That is, a complete reconstruction of the desired cross-sectional images of one region of an object under inspection is performed before moving on to another region of the object.

A disadvantage of requiring consecutive views of a region to be acquired and reconstructed sequentially is that complex or overly constrained system arrangements may be required to orient the object, X-ray source, and/or X-ray detector array in the various ways necessary to produce the needed views (i.e., for the various different angles needed for the reconstruction process). This can increase cost and degrade performance of the image reconstruction system. Another disadvantage is that once imaging of a region is finished, the object must be moved and stabilized prior to starting the imaging of a new region. This non-smooth motion degrades performance and adds complexity.

It should be noted that, depending on the radiographic imaging system used, the object under inspection, X-ray source, X-ray detector array, or some combination of these items may be moved to achieve the various angles at which a region is to be imaged for reconstructing a cross-sectional image of such region. Since the relative positioning of these items is the significant factor for achieving the various angles for imaging a region, for simplicity herein the object is usually referred to as being moved relative to a stationary X-ray source and detector array, but any one or more of these items may be effectively moved in a radiographic imaging system to achieve the needed angles and thus the same concepts apply for other arrangements having similar relative motion of the object, X-ray source, and X-ray detector array.

To achieve high speed, incremental systems usually read image data either directly from a sensor array (or "detector array") or read the data from a dedicated high-speed "frame buffer." Frame buffers are a common way to interface an image sensor array (or detector array) to a computing device. Specifically, a frame buffer may be implemented to store data from a sensor array for one projection (i.e., a view captured for a given X-ray source, sensor array, and object positional arrangement). Frame buffers store data for only one projection at a time. To avoid overwriting unused data before it is used, the sensor array or frame buffer cannot be reused until the reconstruction unit has consumed the previously generated data. This limitation on sensor array and frame buffer reuse timing precludes many high-performance designs.

BRIEF SUMMARY OF THE INVENTION

The present invention is directed to a system and method which utilize data buffers and data access schedules to improve handling of captured image data of an object under inspection for tomosynthetically processing such captured image data to reconstruct desired cross-sectional images therefrom. More specifically, one embodiment implements a data buffer communicatively coupled to a radiographic imaging system (e.g., to a detector array and/or frame buffer) that allows for storage of radiographic image data for at least a portion of multiple different projections of an object under inspection, such as image data associated with one or more angles of view of one or more different regions of the object under inspection, and then later that stored data may be used for reconstructing cross-sectional images for the regions of interest of the object under inspection, rather than reconstructing cross-sectional images for entire regions consecutively as in traditional incremental systems. Because an entire region is not required to be processed for reconstruction thereof (i.e., for reconstruction of desired cross-sectional images of the region) before beginning acquisition of radiographic data for another region, the image reconstruction system of this embodiment provides much more flexibility than is available in traditional image reconstruction systems. For example, this embodiment allows more flexibility as to how the object under inspection, X-ray source, and/or X-ray detector arrays are moved in acquiring radiographic images at various different angles of view.

According to certain embodiments of the present invention, a method for reconstructing cross-sectional images from captured radiographic image data is provided. The method comprises capturing radiographic image data for a first region of an object under inspection and storing the captured radiographic image data for the first region to a data buffer. The method further comprises capturing radiographic image data for a second region of the object under inspection before processing the captured radiographic image data for the first region for reconstructing a cross-sectional image of the first region. The method further comprises processing the captured radiographic image data for the first region and the captured radiographic image data for the second region to reconstruct at least one cross-sectional image of the first and second regions of the object.

According to certain embodiments of the present invention, a system comprises an image capture system operable to capture radiographic image data at a plurality of different projections of an object under inspection. The system further comprises at least one image reconstruction processor operable to process captured radiographic image data for tomosynthetic reconstruction of cross-sectional images of the object under inspection. The system also comprises a data buffer to which captured radiographic image data from the image capture system is stored, wherein the data buffer comprises a plurality of segments, each for storing radiographic image data for a different projection of the object under inspection.

According to certain embodiments of the present invention, a system comprises means for capturing radiographic image data at a plurality of different projections of at least one region of an object under inspection. The system further comprises means for storing the captured radiographic image data of the plurality of different projections of the at least one region, and means for processing the captured radiographic image data to tomosynthetically reconstruct a cross-sectional image of the at least one region. The system further comprises means for determining whether captured radiographic image data for a target number of the different projections of at least a first one of the region(s) is stored to the means for storing, and if the target number of different projections of the at least a first one of the region(s) is stored to the means for storing, triggering processing of the captured radiographic image data of the at least a first one of the region(s) by the processing means.

According to certain embodiments of the present invention, a method is provided that comprises imaging at least one region of an object under inspection at a plurality of different projections, and storing image data for at least a first projection of the region(s) to a first segment of a data buffer. The method further comprises storing image data for at least a second projection of the region(s) to a second segment of the data buffer. The method further comprises determining whether image data for a target number of different projections of at least a first one of the region(s) is stored to the data buffer, and if determined that image data for the target number of different projections of the at least a first one of the region(s) is stored to the data buffer, triggering processing of the image data of the at least a first one of the region(s) for tomosynthetically reconstructing a cross-sectional image thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention

BRIEF DESCRIPTION OF THE DRAWINGS

For a more complete understanding of the present invention, reference is now made to the following descriptions taken in conjunction with the accompanying drawing, in which:

FIG. 10 shows an example operational flow of one embodiment of the present invention in greater detail;

FIG. 12 shows an example of an object that is under inspection logically organized into a plurality of tiles, wherein each tile corresponds to an imaged region of such object;

FIG. 13 shows an example segment of a memory buffer that stores a plurality of different views (or projections) of a region of an object under inspection;

FIG. 14 shows an example table that may be used by a scheduler in certain embodiments to keep track of which regions of an object under inspection have buffers allocated thereto and how many views (or projections) of such regions have been stored in each buffer.

DETAILED DESCRIPTION OF THE INVENTION

Figure 1A:
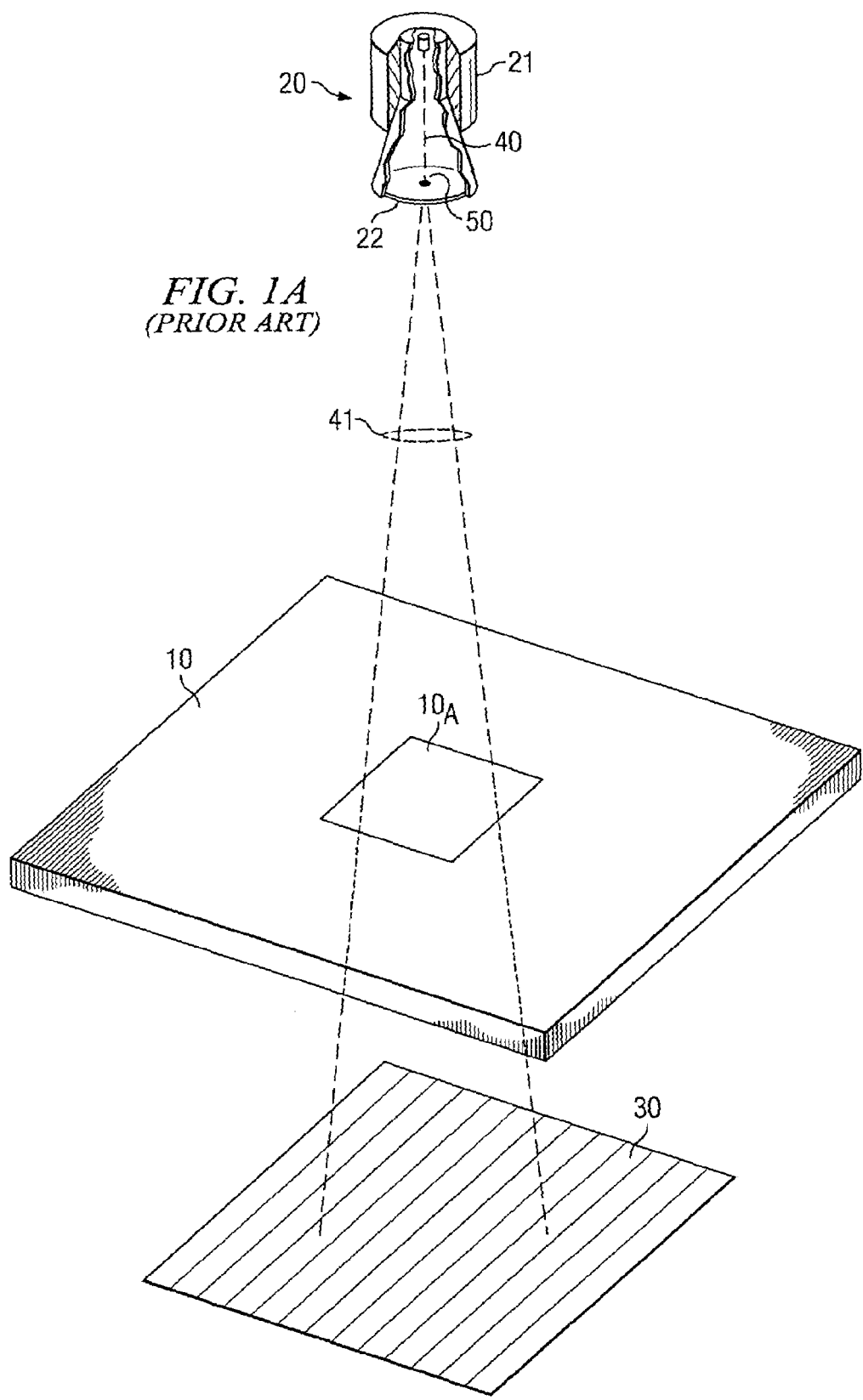
FIGS. 1A-1B show a schematic representation of an example digital tomosynthesis system geometry which may be used with embodiments of the present invention.

Various embodiments of the present invention are now described with reference to the above FIGURES, wherein like reference numerals represent like parts throughout the several views. Embodiments of the present invention provide a technique for improved management of radiographic image data in a tomography system. As described above, tomography systems take a number of radiographic images from various orientations relative to a region of interest of an object under inspection, and combine the radiographic images using tomosynthetic methods, such as Back Projection or shift-and-add, to construct cross-sectional images, which may, in certain implementations, be used to form a 3D, volumetric image of the object (or portion thereof). As described further below, embodiments of the present invention utilize data buffers and data access schedules to improve the image reconstruction operation in various ways.

Various embodiments of the present invention enable improved handling of radiographic images of an object under study for reconstructing cross-sectional images of such object. Preferably, a data buffer and data access scheduler are provided that enable improved data handling for efficient image reconstruction processing. That is, a data buffer is provided for temporarily storing radiographic image data acquired by a radiographic imaging system, and a data scheduler is used to manage the data buffer to provide radiographic image data to an image reconstruction processor in a manner that enables efficient reconstruction of desired cross-sectional images. Embodiments of the present invention may, for example, be implemented within an automated inspection system for inspecting products (e.g., circuit board assemblies) being produced on an assembly line for quality control of such products. Certain embodiments of the present invention enable sufficiently fast cross-sectional image reconstruction of an object under study such that an automated inspection system in which an embodiment is implemented is capable of keeping up with high-speed production lines.

A further advantage of embodiments of the present invention is that operation of a radiographic imaging system may be improved and/or simplified for acquiring sufficient radiographic image data for reconstructing cross-sectional images of an object. For instance, implementing a data buffer and data access scheduler in accordance with an embodiment of the present invention may enable simplified and/or more efficient operation of a radiographic imaging system in acquiring radiographic images of regions of an object under inspection at various different angles for reconstructing cross-sectional images of the regions. A preferred embodiment of the present invention is operable to acquire radiographic images for a first region of an object under inspection and acquire radiographic images for a second region of the object under inspection without requiring that the acquired images for the first region be processed for reconstruction of a cross-sectional image before acquiring the images of the second region. A preferred embodiment acquires image data for multiple regions (e.g., rectangular or linear arrays of pixels) of an object under inspection simultaneously, overlapping, or multiplexed in time, as discussed further below.

More specifically, a preferred embodiment implements a data buffer communicatively coupled to the radiographic imaging system (e.g., to the detector array and/or frame buffer) that allows for storage of radiographic image data for at least a portion of multiple different regions, such as image data associated with one or more angles of view, and then later that stored data may be used for reconstructing cross-sectional images for those regions, rather than reconstructing cross-sectional images for entire regions consecutively as in traditional incremental systems. Because an entire region is not required to be processed for reconstruction thereof (i.e., for reconstruction of desired cross-sectional images of the region) before beginning acquisition of radiographic data for another region, the image reconstruction system of a preferred embodiment provides much more flexibility than is available in traditional image reconstruction systems. For example, a preferred embodiment allows more flexibility as to how the object under inspection, X-ray source, and/or X-ray detector arrays are moved in acquiring radiographic images at various different angles of view.

Also, when imaging a first region of an object, sometimes a portion of one or more other regions is also captured. Such parts of an "out-of-bounds" region are typically discarded in traditional reconstruction systems, but certain embodiments of the present invention may maintain them for increased efficiency. Various other advantages of embodiments of the present invention will be recognized by those of ordinary skill in the art in view of the further description below.

As described above, image processing of objects, such as solder joints, is utilized in automated inspection systems for quality control. For example, a solder joint on a printed circuit board assembly may be imaged (e.g., by a radiographic imaging system), and such image may be processed by an automated inspection system to determine various parameters, such as length, width, curvature, relative opacity, and similar values of the solder joint. The various parameters determined for the solder joint may then be evaluated by the automated inspection system to determine whether the solder joint is of acceptable quality.

As an example, the thickness of solder material (which is typically a combination of lead and tin) may be inspected by an automated inspection system through analysis of X-ray image(s) of the solder material. In an X-ray image of solder material, there is a relationship between the intensities comprising the X-ray image and the thicknesses of the solder material forming the X-ray image. Typically, the image intensity increases from values corresponding to lighter shades of gray (white) to values corresponding to darker shades of gray (black) as the thickness of the solder material increases. That is, the image of a thin section of solder will have a gray level that is less than the gray level of the image of a thicker section of solder. The image of the thin section will appear to be a lighter shade of gray than the image of the thicker section. This convention is typically used in electronic image representation of X-ray images, however, the opposite convention may also be used, i.e., where the image of a thin section of solder has a gray level that is greater than the gray level of the image of a thicker section of solder. The latter convention has traditionally been followed in film radiography where the X-ray images are recorded on X-ray film. Either convention may be implemented with embodiments of the present invention.

Embodiments of the present invention are preferably implemented in a 3D digital tomography system. Various 3D digital tomography imaging systems are well-known in the art, many of which may be used in conjunction with embodiments of the present invention, and thus example imaging systems are only briefly described herein so as not to detract attention away from the inventive system and method for reconstructing 3D image data (voxels) for an object under inspection. Example 3D tomography systems that have been proposed for use in industrial inspection systems and in which embodiments of the present invention may be implemented include those disclosed in U.S. Pat. No. 6,002,739 entitled "COMPUTED TOMOGRAPHY WITH ITERATIVE RECONSTRUCTION OF THIN CROSS-SECTIONAL PLANES" and U.S. Pat. No. 6,178,223 entitled "IMAGE RECONSTRUCTION METHOD AND APPARATUS," the disclosures of which are hereby incorporated herein by reference in their entirety. Of course, various other digital 3D tomography system configurations now known or later developed may be used, and embodiments of the present invention may be implemented with such systems to improve the flexibility and/or efficiency of the 3D reconstruction process thereof. Embodiments of the present invention may be utilized in conjunction with any radiographic imaging device that is capable of capturing image data (pixels) of an object under inspection. More specifically, as described further below, embodiments of the present invention may be implemented with such systems to improve the flexibility and/or efficiency of the reconstruction process in reconstructing cross-sectional images of an object under inspection.

Figure 1B:
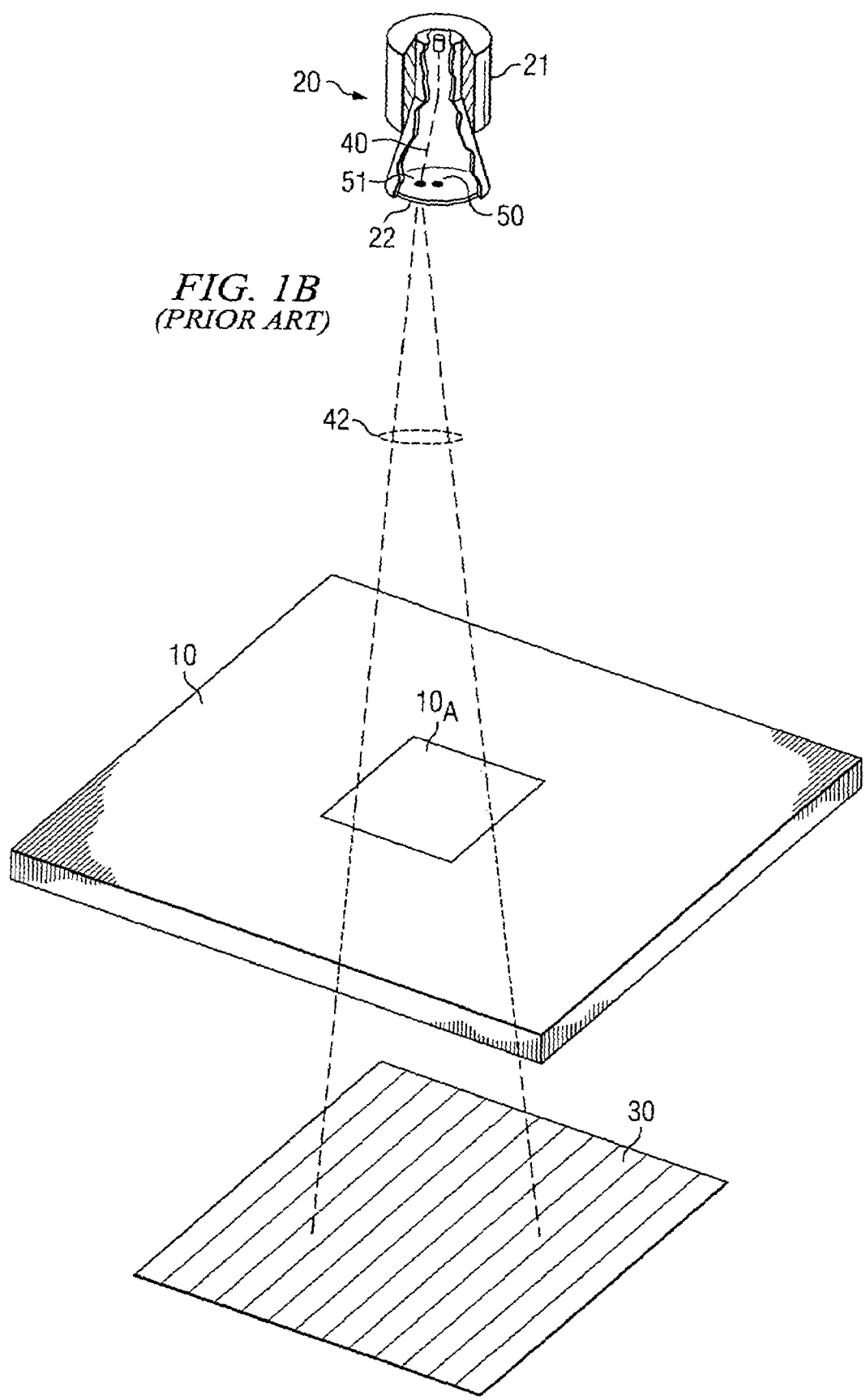

FIGS. 1A-1B show a schematic representation of an example digital tomosynthesis system geometry which may be used with embodiments of the present invention. More specifically, FIGS. 1A-1B show an example cone-beam tomography system. An X-ray source 20 emits X-rays toward an object 10 (e.g., a circuit board assembly) that is under inspection, and the X-rays that pass through object 10 are sensed by an array of sensors (or detectors) 30. To obtain multiple views of a region of object 10 (e.g., for reconstructing cross-sectional images of that region), one or more of X-ray source 20, object 10, and sensor array 30 may be effectively moved. For instance, FIG. 1A shows an example of a region $10_A$ of object 10 being imaged at a first angle of view, and FIG. 1B shows an example of such region $10_A$ of object 10 being imaged at a second angle of view. As described above, image data from multiple views of a region may be processed (e.g., with Back Projection or shift-and-add algorithms) to reconstruct cross-sectional images of the region.

In this example implementation, X-ray source 20 may include an electron beam source comprising a power supply (not shown) for operating X-ray source 20 at a desired voltage level to produce X-rays. Electron beam 40, which is generated within X-ray source 20 by a charged particle gun, is deflected over the source of a target assembly 22 (which may be a grounded anode) in a predetermined pattern (e.g., a scanning or stepping pattern). X-ray source 20 includes a mechanism to control the movement of electron beam 40 across target assembly 22, such as a deflection yoke 21 under the control of an electron beam pattern generator (not shown). One advantage provided by the example geometry of X-ray source 20 is that it allows X-rays to be projected at an object 10 from multiple angles without requiring physical relocation of the X-ray source 20. For instance, X-rays 41 may be generated by bombarding the surface of an X-ray tube with an electron beam 40, and by electronically deflecting the electron beam 40, the X-ray source 20 may be effectively moved. Thus, the X-ray source 20 and/or sensor array 30 may not actually move (but may instead be positionally-fixed) and instead the effect of their movement may be achieved through other techniques, such as by deflecting the X-ray tube's electron beam 40 (e.g., to achieve imaging of object 10 at various different angles of view).

In FIGS. 1A-1B, target assembly 22 is designed to emit X-rays forming a diverging beam 41 in FIG. 1A and forming diverging beam 42 in FIG. 1B that each directly intercept sensor array 30 (from different angles of view). In operation, electron beam 40 may first dwell at location 50 on target assembly 22, as shown in FIG. 1A. As the electron beam 40 strikes target assembly 22 at location 50, a diverging X-ray beam 41 is emitted. In certain embodiments, a collimator grid may be implemented to guide the X-ray beam 41, such as described in U.S. Pat. No. 6,178,223, in environments in which limiting the exposure of object 10 (or other objects present) to X-rays is desirable (e.g., when object 10 is a human subject, such as in medical applications).

In existing radiographic imaging systems, sensor array 30 may comprise a plurality of discrete detectors (referred to herein as "detector elements") arranged in an array. Each detector element includes a surface having a capture area for detecting X-rays, as is well-known in the art. Each detector element may be capable of independently measuring the amount of X-rays that strike it. When an object 10 is interposed between the X-ray source 20 and the sensor array 30, some of the X-rays in X-ray beam 41 (of FIG. 1A) will pass through a portion of object 10, and if not scattered or absorbed, will strike the detector elements that make up sensor array 30. The X-rays that strike any individual detector element comprise a portion of X-ray beam 41 that is referred to herein as an X-ray beam subpath.

Each detector element may comprise components for measuring the quantity of X-ray photons that strike the detector element and outputting a signal representative of that measurement. Alternatively, each detector element may include components for generating an electrical signal generally proportional to the total energy of the X-rays that strike the detector element. The magnitude of the generated electrical signals corresponds to the flux intensity of the X-rays from the appropriate X-ray beam subpath of X-ray beam 41. Each detector element may generate a pixel corresponding to the detected X-rays detected thereby. Utilizing a sensor array 30 that independently measures the X-rays which strike each detector element results in the generation of X-ray transmissiveness information that is proportional to the X-ray flux passing through object 10 along particular X-ray beam subpaths. The resulting intensity data can be used or manipulated to create a representation of object 10.

Of course, various other configurations of a digital radiographic imaging system operable to capture digital, radiographic images of an object 10 may be implemented with embodiments of the present invention, including without limitation that disclosed in U.S. Pat. No. 6,178,223. While a cone-beam radiographic imaging system, such as that of FIGS. 1A-1B, is used in conjunction with a preferred embodiment of the present invention, it should be recognized that the present invention is not limited to a specific configuration of a digital radiographic imaging system. Rather, any configuration of a digital radiographic imaging system operable to capture digital, radiographic image data (pixels) of an object 10 that are now known or later developed may be implemented with embodiments of the present invention. That is, various configurations now known or later developed for capturing digital, radiographic images of an object 10 may be used in conjunction with embodiments of the present invention for handling radiographic image data for reconstructing cross-sectional images of an object under inspection as described hereafter.

Conventional 3D digital tomography approximates an object by discrete volume elements, called voxels. "Voxels" (or "volume pixels") are well known in the art of image processing, and are commonly used in 3D imaging. In general, a voxel is the smallest distinguishable box-shaped part of a three-dimensional image. "Voxelization" is a well-known process of adding depth to an image using a set of cross-sectional images known as a volumetric dataset. The reconstructed cross-sectional images obtained in tomography are generally arrays of voxels. The cross-sections have some small depth and the reconstructed cross-sectional images approximate the X-ray absorption over that depth.

For better understanding of certain principals commonly utilized in 3D tomography and which may be utilized in certain embodiments of the present invention described herein below, aspects of conventional image processing techniques are described in conjunction with FIGS. 2A-2C. Just as embodiments of the present invention are not limited to the example radiographic imaging system configuration described in conjunction with FIGS. 1A-1B, embodiments of the present invention are not intended to be limited in any way by the general image processing principals described in conjunction with FIGS. 2A-2C. Rather, image processing principals, such as use of voxels, are briefly described in conjunction with FIGS. 2A-2C to aid the understanding of the reader to the extent that such principals are described herein as being used in embodiments of the present invention.

Figure 2A:
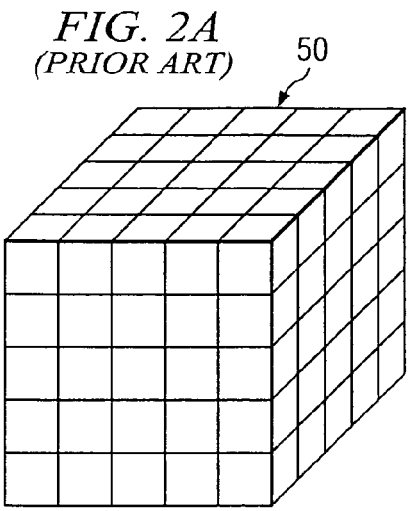
FIG. 2A shows an example cubical object that has been divided into 125 (5×5×5) identically sized cubic voxels.
Figure 2B:
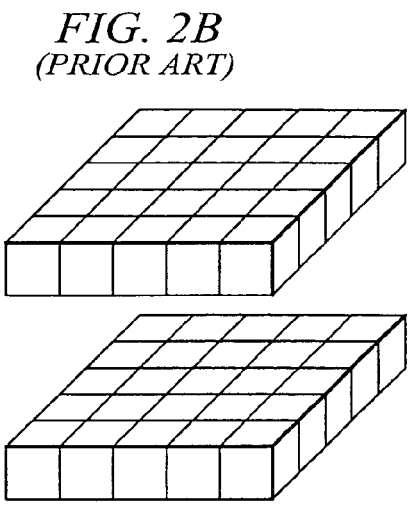
FIG. 2B shows two layers of voxels for the object of FIG. 2A.

FIG. 2A illustrates a cubical object 50 that has been divided into 125 (5×5×5) identically sized cubic voxels. For three-dimensional imaging of object 50, the density (or absorption coefficient, or material thickness) of each of the 125 voxels is reconstructed from the data represented in multiple views of object 50 as detected by an array of sensors such as array 30 in FIGS. 1A-1B.

For many applications, a complete 3D image is not necessary. For example, for inspection of a double-sided circuit board assembly, a few image planes or "cross-sections" may be sufficient to determine solder joint quality. FIG. 2B shows two layers of voxels for the object 50 of FIG. 2A.

Figure 2C:
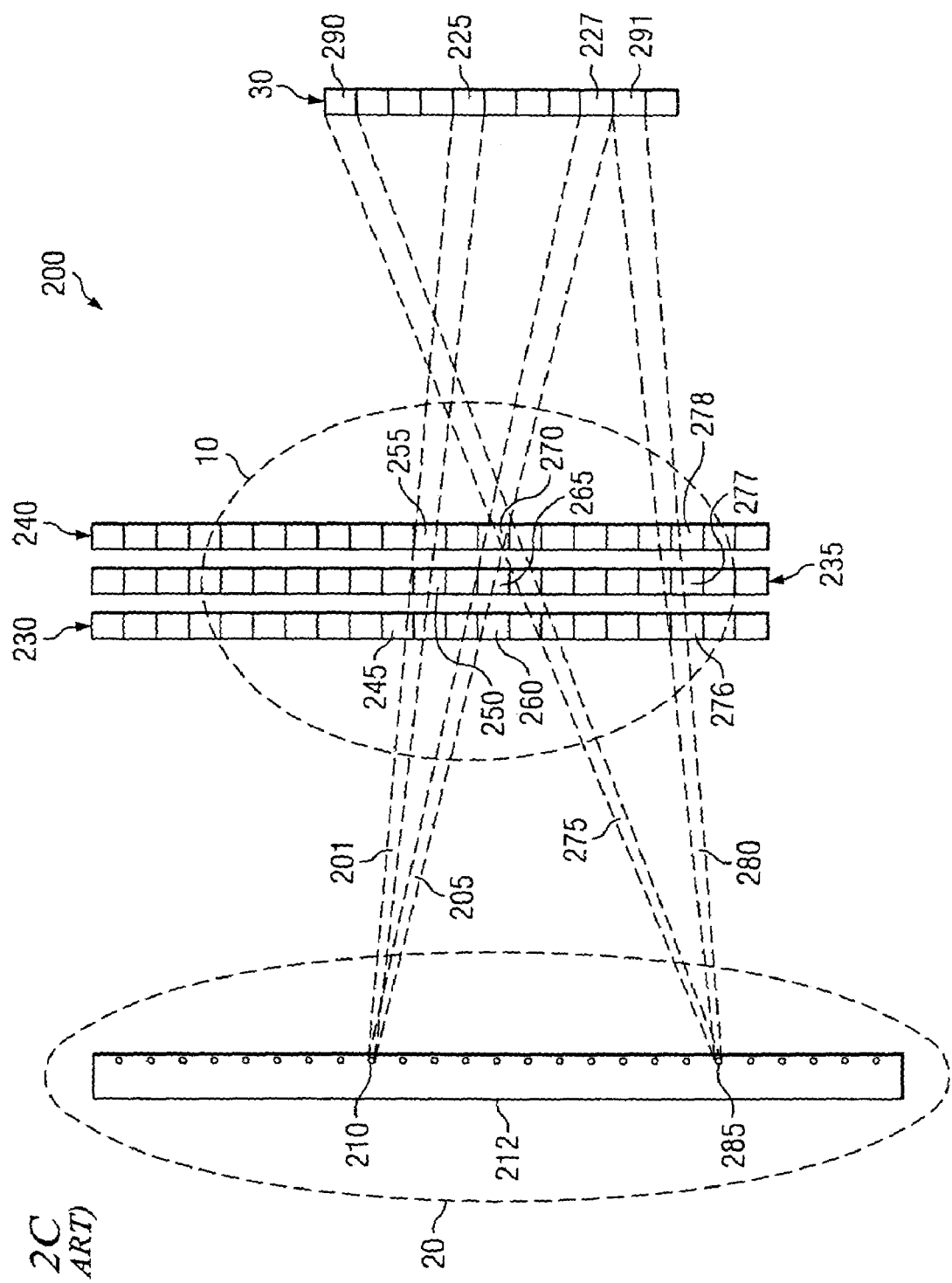
FIG. 2C shows another schematic representation of an example digital tomosynthesis system geometry which may be used with embodiments of the present invention.

Referring to FIG. 2C, an example radiographic imaging system 200, such as that described more fully in U.S. Pat. No. 6,178,223, that may be used for capturing radiographic images of object 10 is shown. In this example configuration of a radiographic imaging system, source 20 includes a collimator grid 212 that is capable of serially directing a plurality of X-ray beams (which may comprise a plurality of X-ray beam subpaths, as described hereafter) to object 10 at various different angles. That is, an X-ray beam is first directed to object 10 at a first angle, and then an X-ray beam is directed to object 10 at a second angle, and so on, to obtain image data for object 10 at a plurality of different angles of view. While collimator grid 212 is used in the example system 200 of FIG. 2C to direct X-ray beams to object 10 at various different angles for capturing sufficient data for reconstructing various depth layers of object 10, it should be recognized that various other techniques now known or later discovered for simultaneously or serially generating X-ray beams that are directed to object 10 at various different angles may be used in other configurations.

As shown in this example, a first X-ray beam subpath 201 and second X-ray beam subpath 205 are ones of many X-ray beam subpaths emanating from a first aperture 210 of collimator grid 212. The remaining X-ray beam subpaths are not shown for the sake of clarity and explanation. Some of the X-rays that travel along first X-ray beam subpath 201 and second X-ray beam subpath 205 pass through object 10 and strike detectors 225 and 227, respectively, of multi-detector array 30. It will be recognized that the information provided to detector 225 by X-rays traveling along first X-ray beam subpath 201 does not correspond to any single point within object 10; rather the path of the first X-ray beam subpath 201 as it passes through the object 10 forms a volume which intersects first slice (or "cross-section" or "depth layer") 230, second slice, 235, and third slice 240. Particularly, X-rays traveling along first X-ray beam subpath 201 creates a volume which is completely or partially coincident with first voxel 245 (of depth layer 230), second voxel 250 (of depth layer 235), and third voxel 255 (of depth layer 240).

The information obtained by detector 225 from X-ray beam subpath 201 may contribute to reconstruction of a first voxel 245 in a reconstructed cross-sectional image corresponding to depth layer 230, to reconstruction of a second voxel 250 in a reconstructed cross-sectional image corresponding to depth layer 235, and to reconstruction of a third voxel 255 in a reconstructed cross-sectional image corresponding to depth layer 240.

With respect to second X-ray beam subpath 205, the information provided by detector 227 may contribute to reconstruction of a fourth voxel 260 in a reconstructed cross-sectional image corresponding to depth layer 230, to reconstruction of a fifth voxel 265 in a reconstructed cross-sectional image corresponding to depth layer 235, and to reconstruction of a sixth voxel 270 in a reconstructed cross-sectional image corresponding to depth layer 240.

A third X-ray beam subpath 275 and fourth X-ray beam subpath 280 are two of many X-ray beam subpaths emanating from a second aperture 285. The remaining X-ray beam subpaths emanating from second aperture 285 are not shown for the sake of clarity and explanation. Some of the X-rays that travel along X-ray beam subpath 275 and X-ray beam subpath 280 pass through object 10 and strike detectors 290 and 291, respectively. As described above with subpaths 201 and 205, the intensity information provided to detector 290 by X-rays traveling along third X-ray beam subpath 275 does not correspond to any single point within object 10; rather the intensity information is an aggregation of information for a volume that intersects all planes/slices between collimator grid 212 of source 20 and sensor array 30, including the planes/slices containing voxel 270. Likewise, the intensity information provided to detector 291 by X-rays traveling along fourth X-ray beam subpath 280 does not correspond to any single point within object 10; rather the intensity information is an aggregation of information for a volume that intersects all planes/slices between collimator grid 212 of source 20 and sensor array 30, including the planes/slices containing voxels 276, 277, and 278.

Pixel data corresponding to the intensity detected by sensor 30 is preferably output by radiographic imaging system 200 to an image reconstructor that is operable to process the pixel data for reconstructing cross-sectional images of the object. In certain embodiments, the image reconstructor processes the received pixel data by, for example, combining or summing the intensity for a voxel from all of the detectors that detect X-rays traveling along X-ray beam subpaths that are completely or partially coincident with that particular voxel and have been assigned to that voxel for the purpose of reconstruction. For example, intensity data collected by detector 227 from X-ray beam subpath 205 in a first pixel output thereby and intensity data collected by detector 290 from X-ray beam subpath 275 in a second pixel output thereby may be used in reconstructing sixth voxel 270 (as both X-ray beam subpaths 205 and 275 intersect with sixth voxel 270). A preferred image reconstruction processor that may be implemented with embodiments of the present invention is disclosed in co-pending and commonly assigned U.S. patent application Ser. No. (Attorney Docket Number 10020619-1) filed Aug. 19, 2003, entitled "SYSTEM AND METHOD FOR PARALLEL IMAGE RECONSTRUCTION OF MULTIPLE DEPTH LAYERS OF AN OBJECT UNDER INSPECTION FROM RADIOGRAPHIC IMAGES," the disclosure of which is hereby incorporated herein by reference. Of course, any other suitable image reconstruction processor now known or later discovered for receiving radiographic image pixels as input and reconstruct therefrom cross-sectional images of an object may be utilized with embodiments of the present invention The radiographic imaging geometry and apparatus shown and described with reference to FIGS. 1A-1B and 2C are typical of that which may be used in conjunction with embodiments of the present invention. However, specific details of these systems are not critical to the practice of the present invention, which addresses handling of radiographic image data of an object for reconstruction of cross-sectional images of the object therefrom. For example, the specific details of the X-ray source, detector(s), positioning mechanism(s) for positioning the object under inspection, control system (e.g., computer) for controlling the operation of the imaging system, etc. may vary considerably from system to system. Embodiments of the present invention are applicable to any type of system which acquires digital radiographic images of an object (e.g., circuit board assembly) from multiple viewpoints and uses such digital radiographic images to reconstruct cross-sectional images corresponding to the depth layers of the object.

FIGS. 3A-3D show example cross-sectional images that may be produced by a reconstruction process for a sample object 10. For illustrative purposes, object 10 shown in FIG. 3A has test patterns in the shape of an arrow 81, a circle 82, and a cross 83 embedded within the object 10 in three different planes (or depth layers) 60a, 60b and 60c, respectively.

Figure 3A:
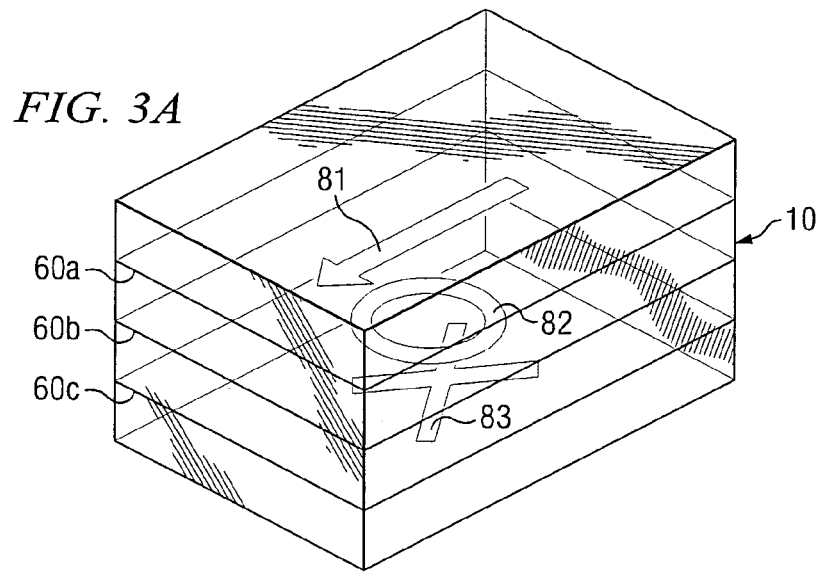
FIGS. 3A-3D show example cross-sectional images that may be produced by a reconstruction process for a sample object.
Figure 3B:
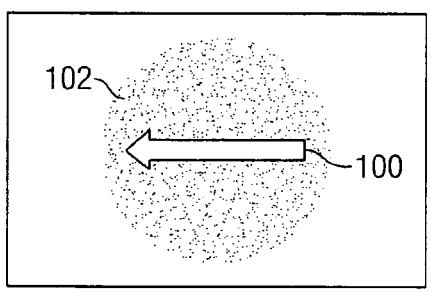

FIG. 3B shows a sample cross-sectional image (or "tomograph") of depth layer 60a of object 10 that may be reconstructed by an image reconstructor in accordance with an embodiment of the present invention. The image 100 of arrow 81 is in sharp focus, while the images of other features within the object 10, such as the circle 82 and cross 83 may form a blurred region 102 which does not greatly obscure the arrow image 100.

Figure 3C:
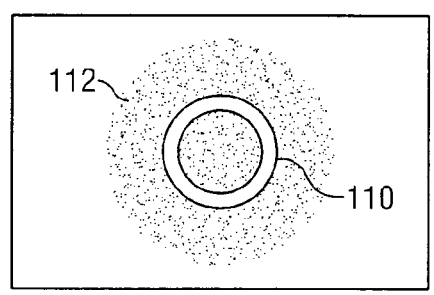

Similarly, FIG. 3C shows a sample cross-sectional image (or "tomograph") of depth layer 60b of object 10 that may be reconstructed by an image reconstructor. The image 110 of circle 82 is in sharp focus, while the images of other features within the object 10, such as the arrow 81 and cross 83 may form a blurred region 112 which does not greatly obscure the circle image 110.

Figure 3D:
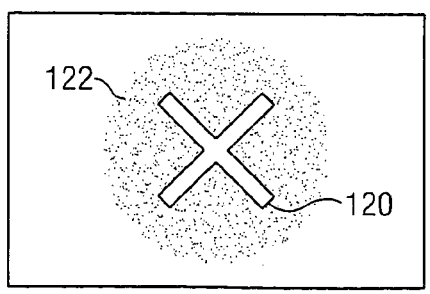

FIG. 3D shows a sample cross-sectional image (or "tomograph") of depth layer 60c of object 10 that may be reconstructed by an image reconstructor. The image 120 of cross 83 is in sharp focus, while the images of other features within the object 10, such as the arrow 81 and circle 82 may form a blurred region 122 which does not greatly obscure the cross image 120.

While FIGS. 3A-3D show an example object 10 having depth layers 60a, 60b, and 60c that may be reconstructed as cross-sectional images, it should be recognized that object 10 is intended as a generic example to illustrate the concept of reconstructing various depth layers of an object as cross-sectional images. In practice, various other types of objects having any number of depth layers may be inspected, and any number of their depth layers may be reconstructed as cross-sectional images. For example, a preferred embodiment may be implemented with an automated inspection system for inspecting solder joints on a printed circuit board assembly.

It is to be understood that the term "image" (or "image data"), as used herein, is not limited to formats which may be viewed visually, but may also include digital representations that may be acquired, stored, and analyzed by the computer. Thus, the term "image" (or "image data"), as used herein, is not limited to a viewable image, but is intended to also encompass computer data that represents the image and/or that may be processed by a computer for displaying a viewable image. For instance, in certain embodiments, the reconstructed cross-sectional images may be displayed to a user for inspection by such user in addition to or instead of automated inspection by the computer. In other embodiments, the reconstructed cross-sectional images may not be displayed to a user, but instead the image data representing such reconstructed cross-sectional images may be autonomously analyzed by the computer for quality control. As a further example, in certain embodiments, radiographic image data acquired for an object may be processed for reconstructing cross-sectional images of the object, and such radiographic image data may or may not itself be viewed visually depending on the specific implementation of the inspection system.

Figure 4:
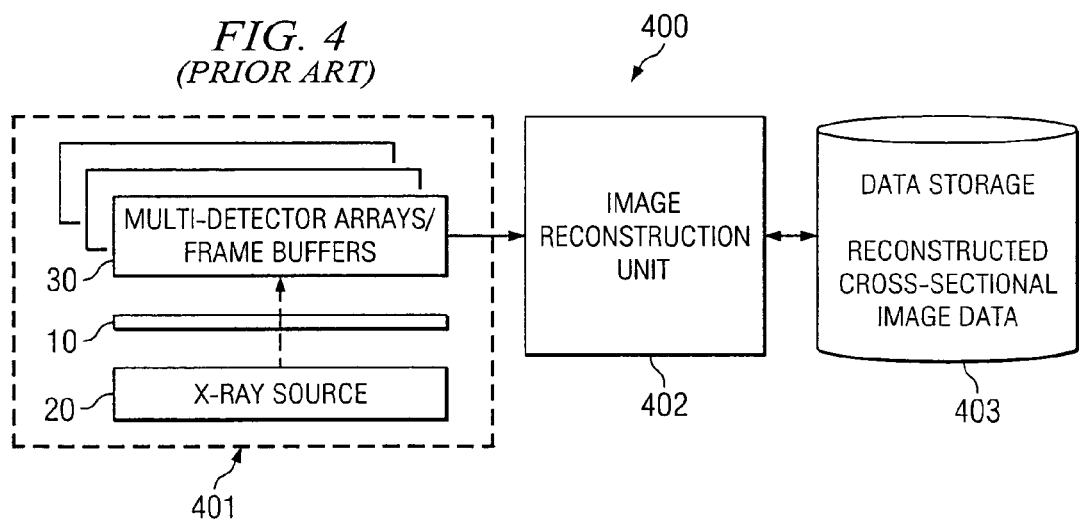
FIG. 4 shows an example high-level block diagram of a traditional image reconstruction system.

Turning to FIG. 4, an example high-level block diagram of a traditional image reconstruction system 400 is shown. In the example of FIG. 4, image reconstruction system 400 comprises a radiographic imaging system 401, which may, for example, be a cone-beam tomographic imaging system such as described above with FIGS. 1A-1B. As shown, radiographic imaging system 401 may comprise X-ray source 20 and X-ray detector array (and in some implementations frame buffers) 30 for acquiring radiographic images of object 10. Image reconstruction unit (or "reconstruction processor") 402 is communicatively coupled to radiographic imaging system 401 such that it can receive radiographic image data ("pixels") from detector array/frame buffers 30. Reconstruction processor 402 is also communicatively coupled to data storage (or "memory") 403 which is used to store reconstructed cross-sectional image data. Operation of the traditional image reconstruction system 400 is described more fully hereafter in conjunction with FIGS. 5A-5D and 6.

As described above, a region of an object is generally imaged at various different angles of view to acquire sufficient radiographic image data for reconstructing one or more cross-sectional images of the region. Generally, a "region" of an object is a portion that can be imaged at one time. For example, an entire circuit board is typically not imaged at once by a radiographic imaging system because of constraints of the detector array, the X-ray source, etc., but rather the circuit board may be divided into regions for imaging one small portion of the board (e.g., a square inch area) at a time. It should be recognized that acquiring radiographic images of a region of an object at various different angles may result in acquisition of a substantial amount of radiographic image data for each region. Typically, reconstruction is performed incrementally as images of various views are collected, which increases throughput and avoids excessive storage of captured pixel data. Traditional incremental systems consecutively acquire all radiographic images for one region of an object that are needed for reconstructing desired cross-sectional image(s) of that region before acquiring images for another region. The images of a first region of an object are sequentially processed and the result accumulated into a reconstruction of one or more desired cross-sections of that region, and the reconstructed cross-section(s) is/are output (or stored) before beginning processing for another region of the object. System resources are then reused for reconstructing desired cross-section(s) of the next region.

Figure 5A:
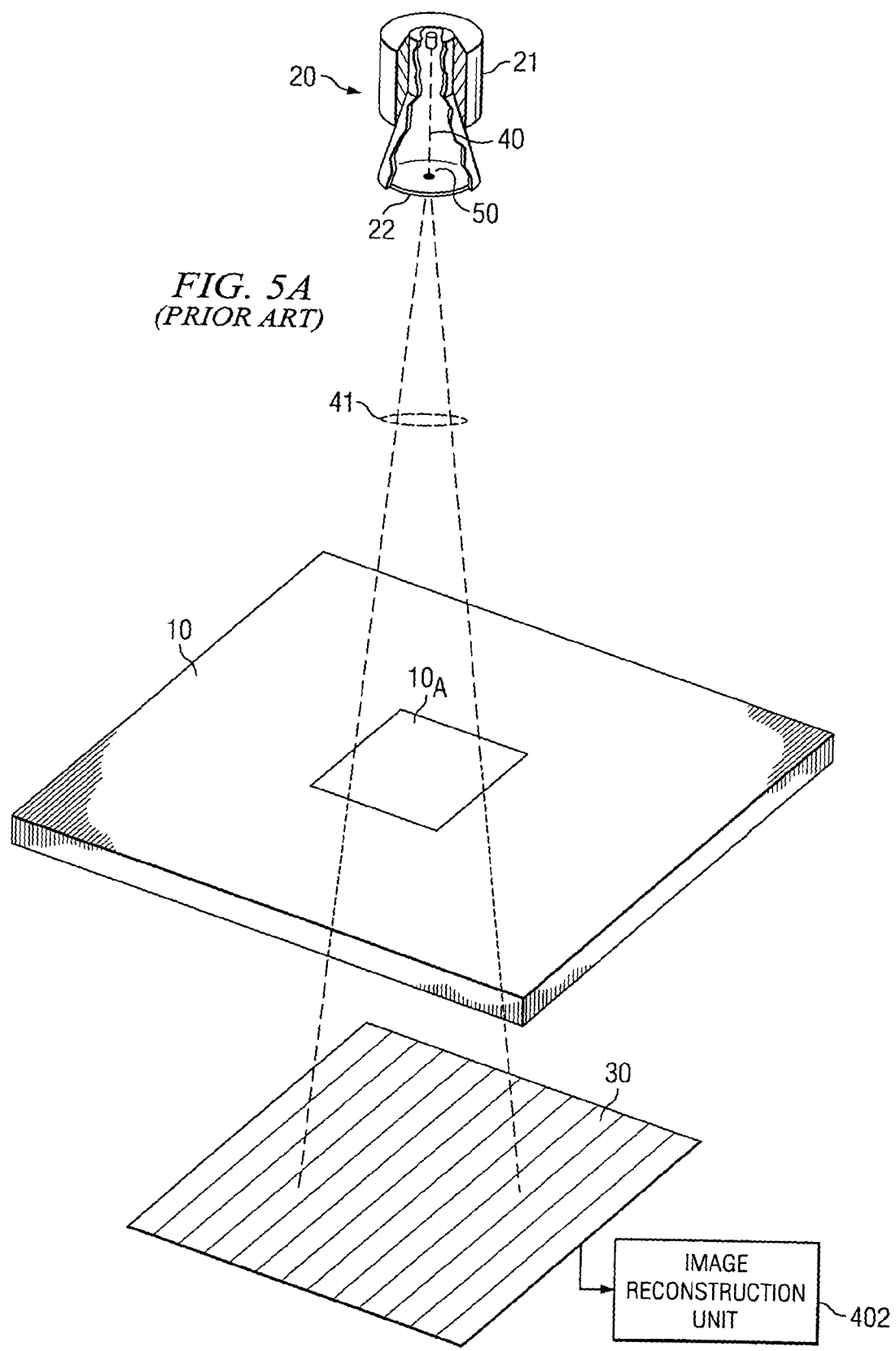
FIGS. 5A-5D show an example of the operation of a traditional incremental system.
Figure 5B:
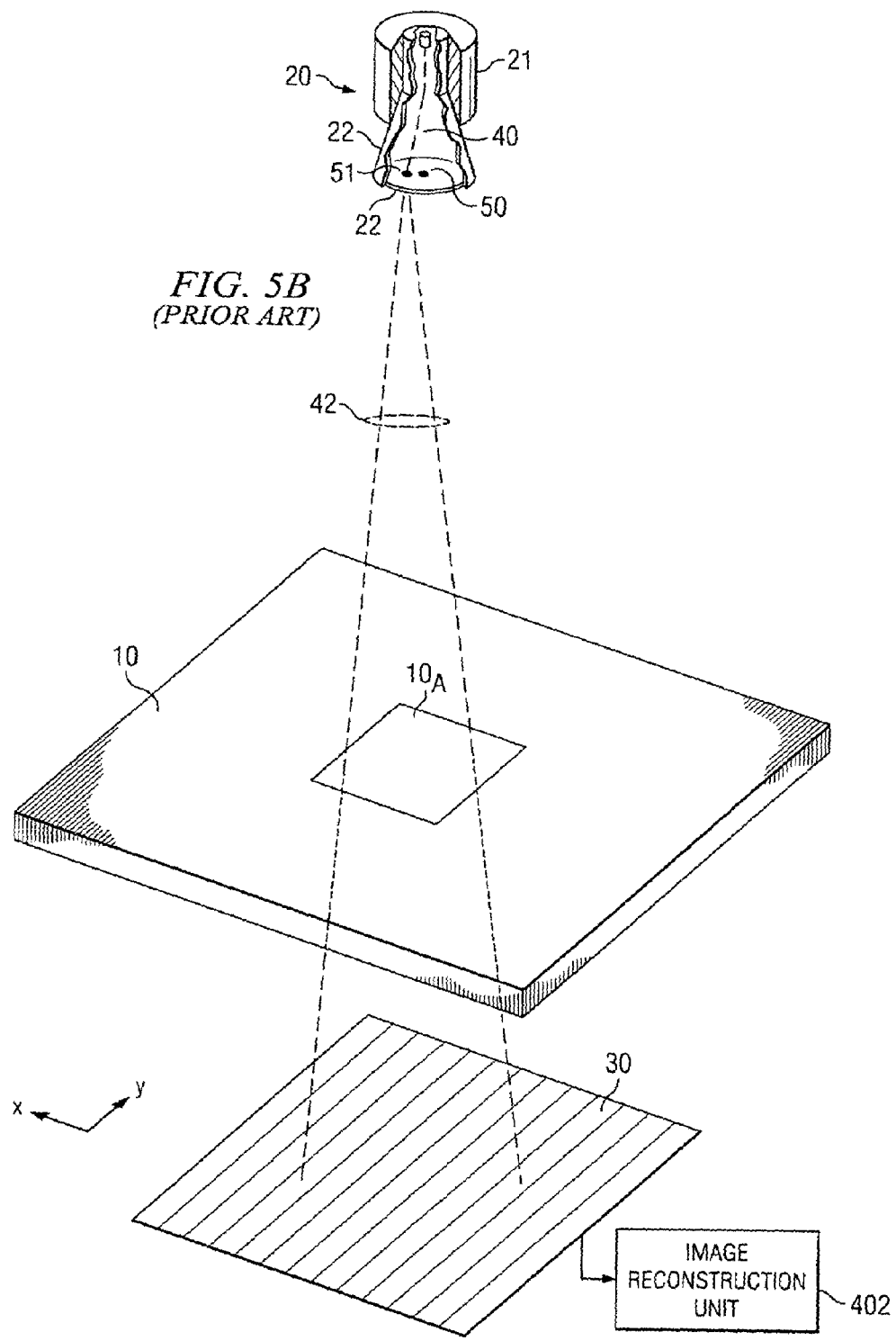

An example of the operation of a traditional incremental system is shown in FIGS. 5A-5D. More specifically, FIGS. 5A-5D show that traditional incremental systems reconstruct desired cross-sectional image(s) of a first region of an object under inspection before acquiring radiographic image data for a second region of the object, as explained further below. As shown in FIG. 5A, in a traditional incremental system, the example radiographic imaging system of FIGS. 1A-1B may be used to first acquire radiographic images of a first region $10_A$ of object (e.g., circuit board assembly) 10. That is, X-ray source 20 and detector array 30 may be effectively moved in a coordinated pattern (e.g., step pattern) as described above with FIGS. 1A-1B to acquire radiographic images of first region $10_A$ at various different angles of view. For instance, in FIG. 5A radiographic image data is captured by detector array 30 for first region $10_A$ at a first angle of view. Thereafter, in FIG. 5B, radiographic image data is captured by detector array 30 for first region $10_A$ at a second angle of view. That is, beam 40 may be directed to a first position 50 on anode 22 (in FIG. 5A) to enable imaging of region $10_A$ at a first angle of view, and beam 40 may be directed to a second position 51 on anode 22 (in FIG. 5B) to enable imaging of region $10_A$ at a second angle of view. Beam 40 may be moved about the perimeter of anode 22 (e.g., in a predefined step pattern) and/or one or more of source 20, detector array 30, and object 10 may be moved for imaging region $10_A$ at various different angles of view needed for the reconstruction of one or more desired cross-sectional images of such region $10_A$. The radiographic images of the various different angles of view of region $10_A$ are incrementally communicated from detector array 30 (and its associated frame buffers) to an image reconstruction unit 402 which processes the radiographic images to reconstruct the one or more desired cross-sectional images of region $10_A$.

Figure 5C:
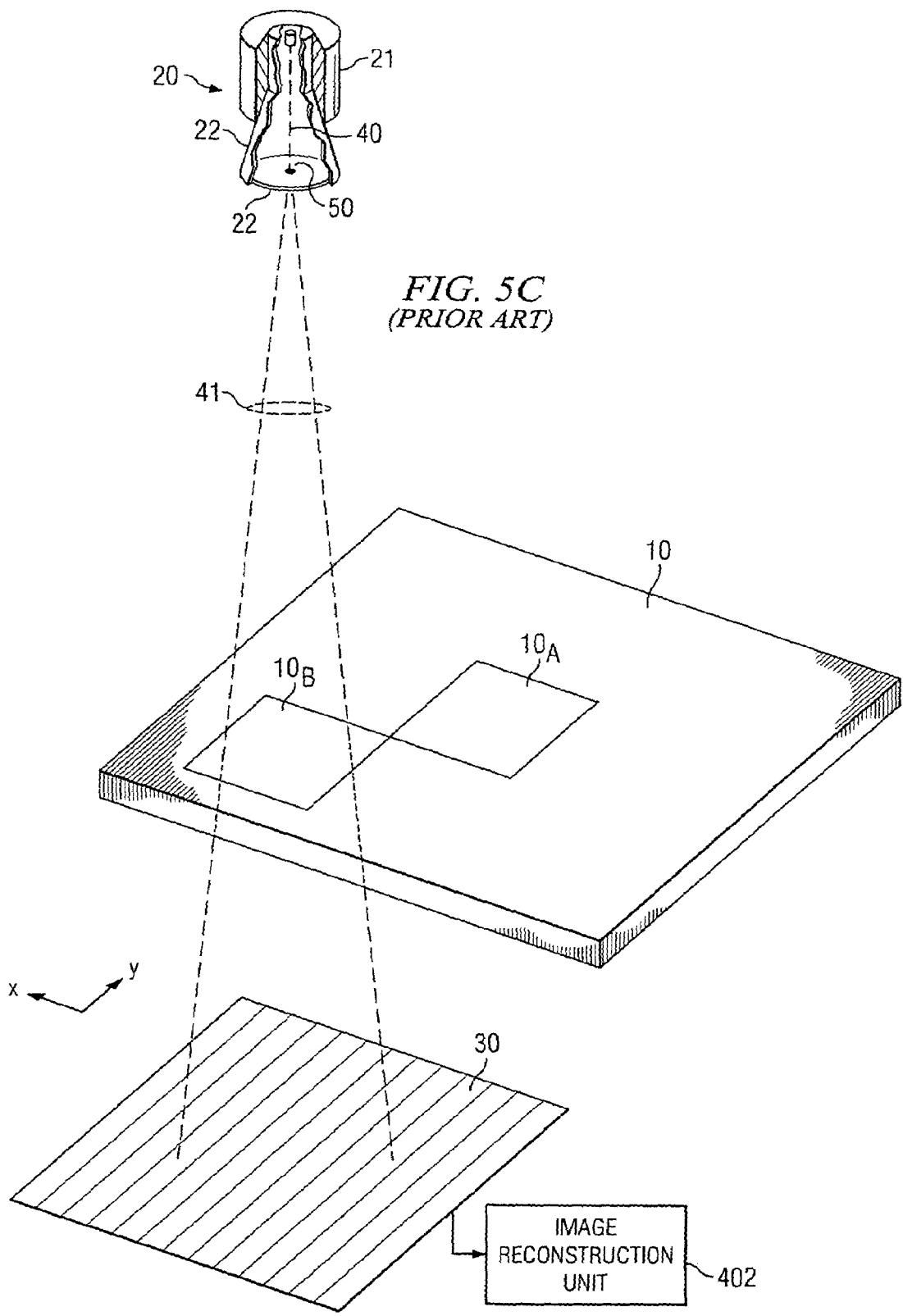
Figure 5D:
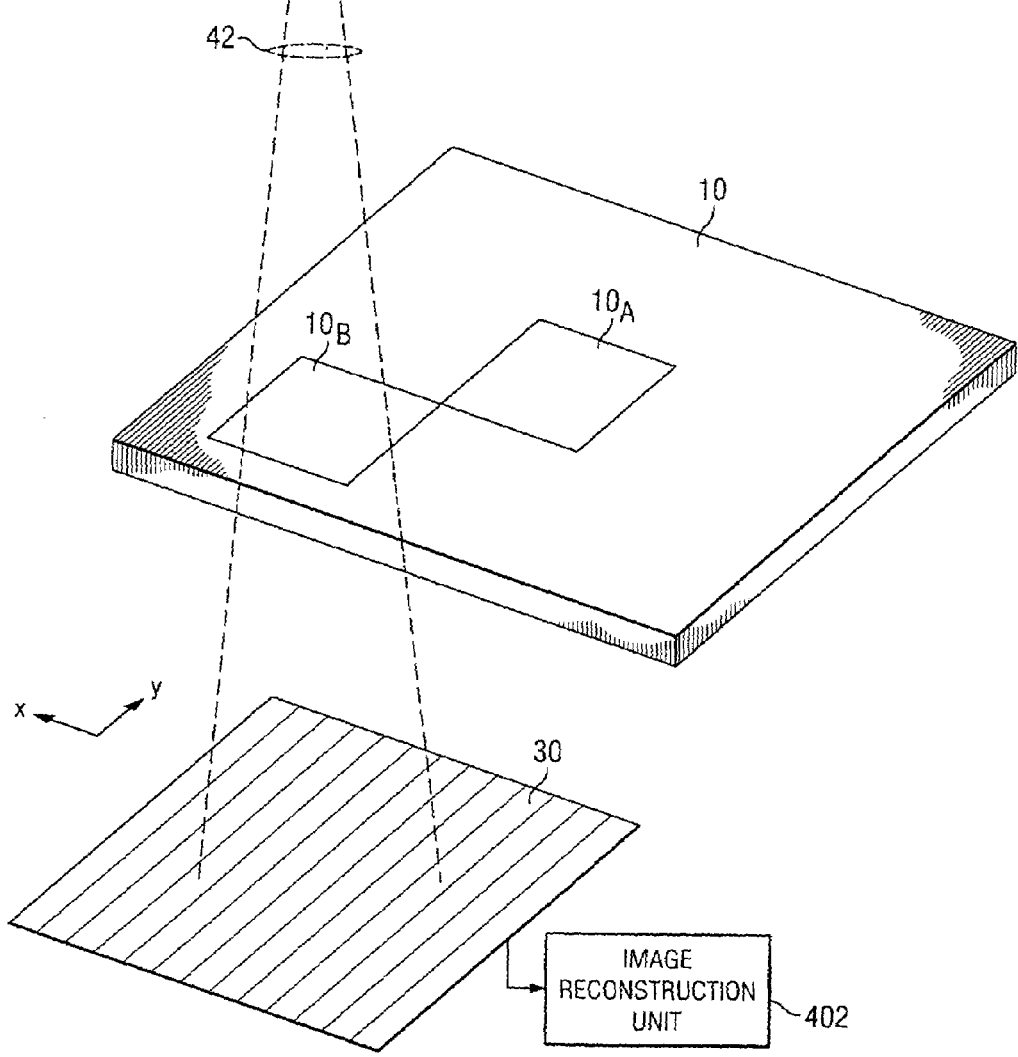

Once the reconstruction of the desired cross-sectional image(s) of first region $10_A$ is complete, then the attention of the radiographic imaging system may be directed to a second region, such as region $10_B$ shown in FIG. 5C. That is, one or more of object 10, X-ray source 20, and detector array 30 may be moved to direct the focus of the radiographic imaging system to second region $10_B$. As with first region $10_A$, X-ray source 20 and detector array 30 may be effectively moved in a coordinated pattern to acquire radiographic images of second region $10_B$ at various different angles of view. For instance, in FIG. 5C radiographic image data is captured by detector array 30 for second region $10_B$ at a first angle of view. Thereafter, in FIG. 5C, radiographic image data is captured by detector array 30 for second region $10_B$ at a second angle of view. That is, beam 40 may be directed to a first position 50 on anode 22 (in FIG. 5C) to enable imaging of region $10_B$ at a first angle of view, and beam 40 may be directed to a second position 51 on anode 22 (in FIG. 5D) to enable imaging of region $10_B$ at a second angle of view. Beam 40 may be moved about the perimeter of anode 22 (e.g., in a predefined step pattern) and/or one or more of source 20, detector array 30, and object 10 may be moved for imaging region $10_B$ at various different angles of view needed for the reconstruction of one or more desired cross-sectional images of such region $10_B$. The radiographic images of the various different angles of view of region $10_B$ may be incrementally communicated to image reconstruction unit 402 which processes the radiographic images to reconstruct the one or more desired cross-sectional images of region $10_B$.

Figure 6:
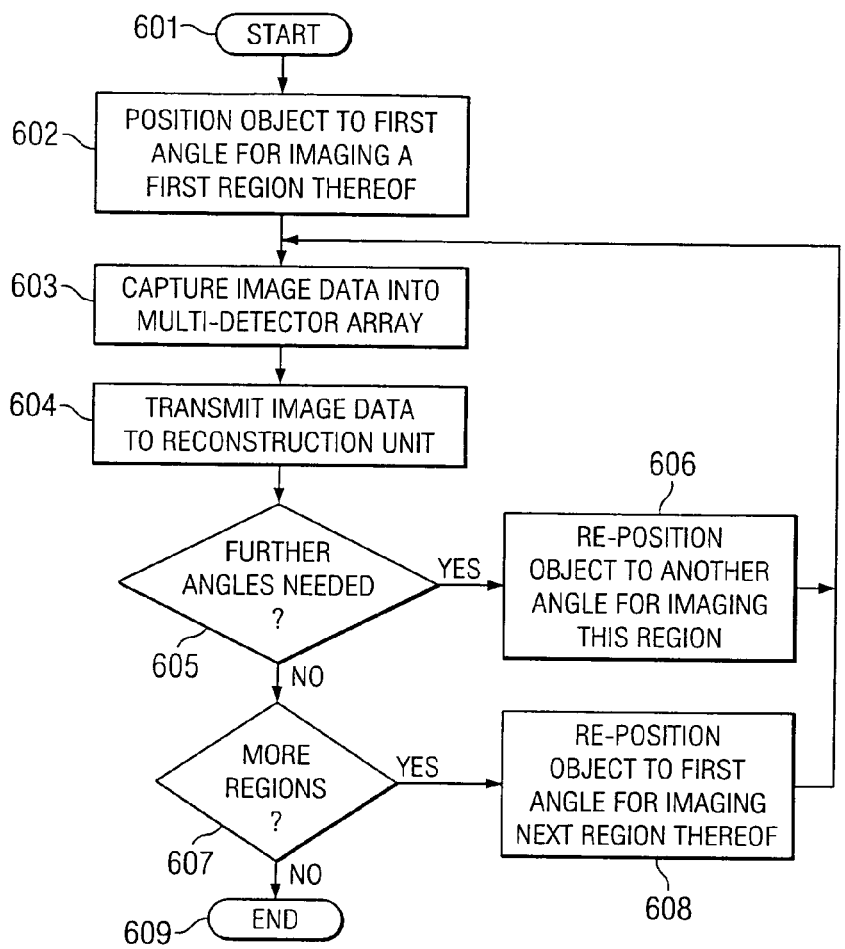
FIG. 6 shows an operational flow diagram of a traditional incremental image reconstruction system.

A typical operational flow of a traditional incremental image reconstruction system is shown further in FIG. 6. As shown, the process starts in operational block 601. In operational block 602, the object 10 is positioned to a first angle of view for imaging a first region $10_A$ thereof. The radiographic imaging device is then used to capture image data for this first angle of view of first region $10_A$ into its detector array/frame buffers at operational block 603. Some radiographic imaging systems include a dedicated high-speed frame buffer for interfacing the detector array 30 with the reconstruction processor unit 402. Specifically, a frame buffer, when implemented, stores data from detector array 30 for one projection (i.e., for one angle of view) of a region being imaged at a time. That is, a frame buffer does not store data for multiple angles of view of a region or for multiple regions of an object 10, but instead stores data for one angle of view of one region. To avoid overwriting unused data, the detector array or frame buffer cannot be re-used in traditional radiographic imaging systems until the reconstruction unit 402 has consumed the previously generated radiographic image data.

At block 604, the acquired radiographic image data is transmitted to an image reconstruction unit 402 for reconstructing desired cross-sectional image(s) of this region $10_A$. It should be recognized that boundary conditions are typically established for a given region being imaged, and during the imaging of operational block 603, some "out of bounds" image data corresponding to an area outside of the given region may be captured. For example, in imaging region $10_A$, some out of bounds image data (i.e., image data for an area of object 10 outside of region $10_A$) may inadvertently be captured for one or more of the angles of view. For instance, some out of bounds image data may be captured that corresponds to a portion of region $10_B$ when imaging region $10_A$. Traditionally, such out of bounds image data is discarded. That is, such out of bounds image data is traditionally not stored or sent to the reconstruction unit in operational block 604.

At block 605, it is determined whether image data of further angles of view are needed for reconstructing desired cross-sectional image(s) of the region $10_A$. That is, it is determined whether further radiographic image data is needed for reconstruction unit 402 to reconstruct desired cross-sectional image(s) of region $10_A$. If further angles of view are needed, then the object 10 (and/or the X-ray source 20 and/or detector array 30) are moved for imaging another angle of view of region $10_A$. For instance, as described with FIGS. 5A-5B, source 20 and/or detector array 30 may be effectively moved in a coordinated pattern to acquire various different angles of view of region $10_A$.

Once it is determined in operational block 605 that no further angles of view are needed for region $10_A$, operation advances to block 607 whereat it is determined whether more regions of object 10 are to be reconstructed. If another region is to be reconstructed, such as region $10_B$ in the example of FIGS. 5C-5D, then in block 608 the object is re-positioned to the first angle of view for imaging such next region $10_B$, and operation returns to block 603 for capturing image data into detector array 30 for this second region $10_B$. Operation continues in this manner until it is determined at block 607 that no further regions of object 10 are to be reconstructed in which operation ends in block 609.

Accordingly, in traditional inspection systems, radiographic images are acquired and processed to reconstruct desired cross-sectional image(s) for one region of an object under inspection at a time. That is, a complete reconstruction of desired cross-sectional image(s) of one region of an object under inspection, such as region $10_A$ in the above example, is performed before moving on to another region of the object, such as region $10_B$.

Figure 7:
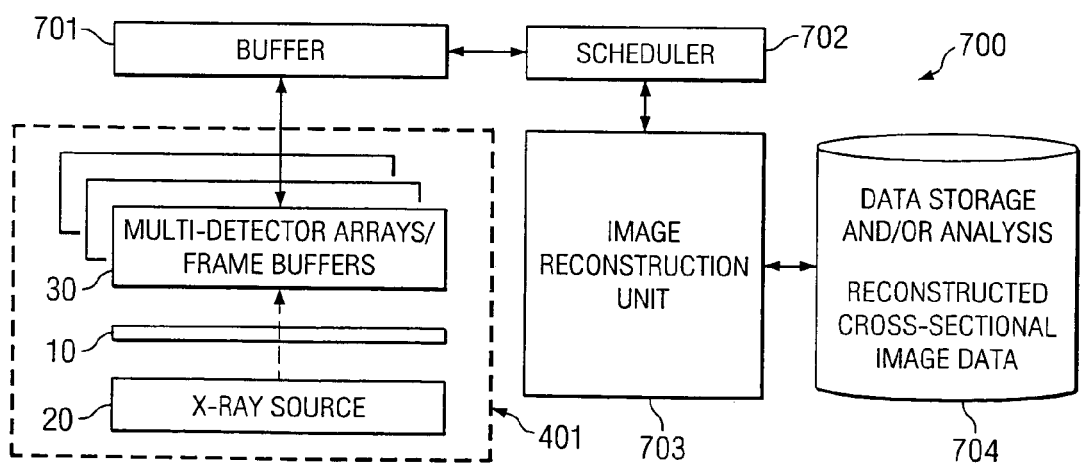
FIG. 7 shows an example block diagram of a preferred embodiment of the present invention.

Turning now to FIG. 7, an example block diagram of a preferred embodiment of the present invention is shown. In the example of FIG. 7, image reconstruction system 700 comprises a radiographic imaging system 401, which may, for example, be a cone-beam tomographic imaging system such as described above with FIGS. 1A-1B. Of course, radiographic imaging system 401 may comprise any suitable system now known or later developed for capturing radiographic image data (pixels) of an object for use in reconstruction of cross-sectional images of the object. As shown in this example, radiographic imaging system 401 may comprise X-ray source 20 and X-ray detector array (and in some implementations frame buffers) 30 for acquiring radiographic images of object 10.

Data buffer 701 is communicatively coupled to detector array/frame buffers 30 of radiographic imaging system 401. As described further below, data buffer 701 is used to store radiographic image data for a region of object 10 such that radiographic image data may be acquired for a plurality of different regions before processing such radiographic image data for reconstructing one or more cross-sectional views of any one of the plurality of different regions.

Image reconstruction system 700 further comprises data access scheduler 702 that is operable to manage the radiographic image data in buffer 701. For example, in a preferred embodiment, data access scheduler 702 may be implemented to monitor the radiographic image data stored in buffer 701 and trigger processing by image reconstruction unit 703 of radiographic image data for a region of object 10 once sufficient data is acquired for such region to enable reconstruction of a cross-sectional image of the region. Scheduler 702 may, in certain embodiments, be implemented to recognize when sufficient data is accumulated in buffer 701 to enable image reconstruction unit 703 to perform reconstruction for at least a portion of an object 10 under inspection.

Further, in certain embodiments, multiple reconstruction units 703 may be utilized, and scheduler 702 may be implemented to make efficient utilization of the multiple reconstruction units. For example, scheduler 702 may be implemented to recognize when sufficient data of a first type (e.g., corresponding to a first region of object 10) is accumulated in buffer 701, and may, in response to recognizing that a sufficient amount of the first type of data is accumulated in buffer 701 (e.g., sufficient amount to enable reconstruction unit 703 to begin processing thereof for reconstruction of a cross-section), send this first type of data to a first reconstruction unit. Scheduler 702 may further be implemented to recognize when sufficient data of a second type (e.g., corresponding to a second region of object 10) is accumulated in buffer 701, and may, in response to recognizing that a sufficient amount of the second type of data is accumulated in buffer 701 (e.g., sufficient amount to enable reconstruction unit 703 to begin processing thereof for reconstruction of a cross-section), send this second type of data to a second reconstruction unit.

Image reconstruction unit (or "reconstruction processor") 703 is operable to receive radiographic image data (pixels) from buffer 701 and process such data to reconstruct cross-sectional images of object 10. Reconstruction processor 703 is communicatively coupled to data storage (or "memory") 704 which is used to store reconstructed cross-sectional image data. While any reconstruction processor 703 now known or later discovered for receiving radiographic image data and processing such data to reconstruct cross-sectional images of an object under inspection may be utilized and may benefit from buffer 701 and scheduler 702 of embodiments of the present invention, a preferred image reconstruction processor that may be implemented with embodiments of the present invention is disclosed in co-pending and commonly assigned U.S. patent application Ser. No. (Attorney Docket Number 10020619-1) filed Aug. 19, 2003, entitled "SYSTEM AND METHOD FOR PARALLEL IMAGE RECONSTRUCTION OF MULTIPLE DEPTH LAYERS OF AN OBJECT UNDER INSPECTION FROM RADIOGRAPHIC IMAGES," the disclosure of which has been incorporated herein by reference.

Buffer 701 and scheduler 702 may each comprise hardware, software, and/or firmware for implementing the operative features described herein. Further, the amount of memory implemented in buffer 701 may vary from implementation to implementation. Also, although shown as separate blocks in the example of FIG. 7, either or both of buffer 701 and scheduler 702 may, in certain configurations, be implemented as part of imaging system 401 or image reconstruction unit 703. Operation of a preferred embodiment of the present invention is described more fully hereafter in conjunction with FIGS. 8A-8D, 9, 10, and 11.

An example of the operation of a preferred embodiment of the present invention is shown in FIGS. 8A-8D. More specifically, FIGS. 8A-8D show that a preferred embodiment of the present invention enable radiographic image data to be acquired for a plurality of different regions of an object under inspection without requiring that the acquired data for one region be processed for reconstructing a cross-sectional image thereof before acquiring the radiographic image data for another region, as explained further below. It should be understood that many of the figures used herein, including FIGS. 8A-8D are not drawn to scale. For instance, in actual practice the X-ray imaging system may yield a magnification typically around 5x, though it is typically adjustable. For simplicity and ease of illustration, various features of the figures (such as FIGS. 8A-8D) are not shown to scale, but the general concepts described in conjunction with those figures herein will be understood by those of ordinary skill in the art.

Figure 8A:
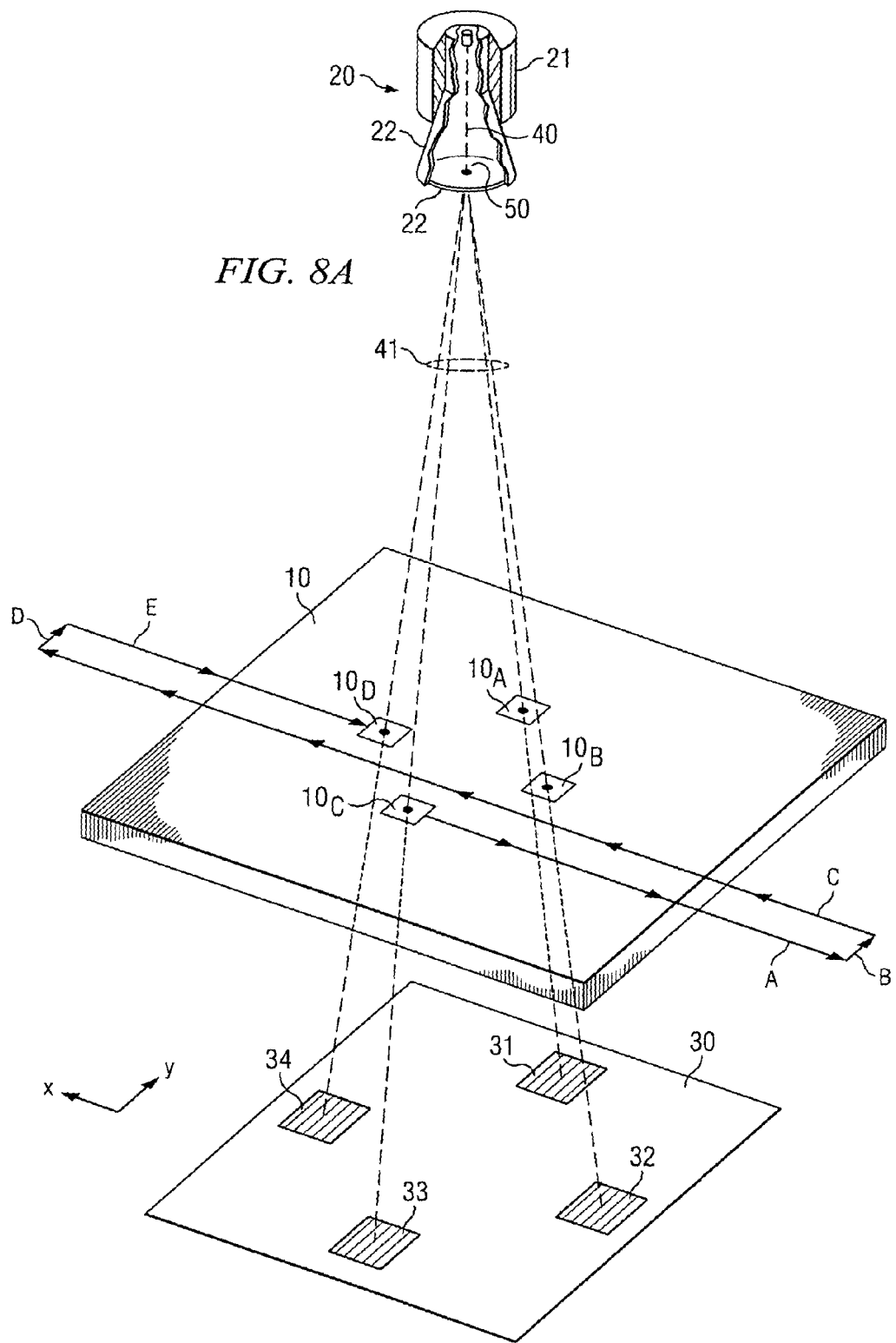
FIGS. 8A-8D show an example of the operation of a preferred embodiment of the present invention.

As shown in FIG. 8A, an example radiographic imaging system may be implemented that allows for image data for a plurality of different regions of object 10 to be captured simultaneously. More specifically, in the example of FIGS. 8A-8D, four distinct multi-detector arrays 31, 32, 33, and 34 are implemented as part of imaging system 30. Each multi-detector array is operable to simultaneously capture radiographic image data for a different region of object 10. For instance, each detector of each multi-detector array may measure the amount of X-rays that strike it and generate a corresponding pixel. When object 10 is interposed between the X-ray source 20 and the multi-detector arrays 31, 32, 33, and 34, some of the X-rays in X-ray beam 41 (of FIG. 8A) will pass through regions 10A, 10B, 10C, and 10D of object 10, and if not scattered or absorbed, will strike the multi-detector arrays 31, 32, 33, and 34. Each detector element of each multi-detector array may comprise components for measuring the quantity of X-ray photons that strike the detector element and outputting a signal representative of that measurement for the corresponding region of object 10. Alternatively, each detector element of each multi-detector array may include components for generating an electrical signal generally proportional to the total energy of the X-rays that strike the detector element. In this case, the magnitude of the generated electrical signals corresponds to the flux intensity of the X-rays from the appropriate X-ray beam subpath of X-ray beam 41.

While four distinct multi-detector arrays are shown in the example of FIGS. 8A-8D, it should be recognized that in alternative implementations any number of multi-detector arrays may be used, and embodiments of the present invention are therefore not limited solely to four multi-detector arrays but may comprise more or less multi-detector arrays for capturing radiographic image data for regions of object 10. Further, each multi-detector array may comprise any desired number of detector elements. Implementing a plurality of multi-detector arrays, as shown in FIGS. 8A-8D, may be beneficial in that it may reduce the cost of the imaging system. For instance, individual multi-detector arrays 31, 32, 33, and 34 may each be of a relatively small size (e.g., 1 inch by 1 inch) and may therefore be much less costly than a larger multi-detector array (such as a multi-detector array of 6 inches by 6 inches) often used in imaging systems, such as the relatively large multi-detector array 30 shown in the example of FIGS. 1A-1B. Further, the plurality of multi-detector arrays 31, 32, 33, and 34 (referred to collectively herein as multi-detector arrays 30) may increase the efficiency of the radiographic imaging system by enabling a radiographic image of multiple regions of an object 10 to be captured simultaneously. However, alternative embodiments of the present invention may be implemented for various other radiographic imaging configurations, including a configuration that utilizes a single multi-detector array, such as multi-detector array 30 of FIGS. 1A-1B, and the buffers and scheduling techniques described herein may be utilized to improve the efficiency of the tomographic reconstruction of cross-sectional images from the radiographic image data captured by such imaging configurations.

In the example of FIGS. 8A-8D, object 10 is moved in a "lawnmower" step pattern (such as shown in FIG. 8A) and is imaged at various points along that pattern. That is, the example operation of FIGS. 8A-8D assumes that object 10 is being moved in a lawnmower pattern, such as that shown in FIG. 8A, in discrete steps and that it is currently in a portion of the lawnmower pattern (labeled "A" in FIG. 8A) in which it is being moved to the right along the X-axis. The movement is discrete, meaning object 10 is moved into a position (along the lawnmower pattern), then stopped, and then images are taken while it is stopped. When object 10 moves so far to the right that it is out of view of multi-detector arrays 30, it will continue the lawnmower pattern by moving along the Y-axis, as in the portion of the lawnmower pattern labeled "B" in FIG. 8A. In this example, object 10 is displaced a distance along the Y-axis (in portion "B" of the pattern) corresponding to an imaged region. Object 10 then starts moving to the left (along the X-axis) in discrete steps, as in the portion of the lawnmower pattern labeled "C" in FIG. 8A, and so on. Object 10 is then again displaced a distance along the Y-axis (in portion "D" of the pattern) corresponding to an imaged region. Object 10 then starts moving to the right (along the X-axis) in discrete steps, as in the portion of the lawnmower pattern labeled "E" in FIG. 8A, and so on.

Of course, while object 10 is described as being moved in discrete steps along the lawnmower pattern in the above example of FIG. 8A, it need not be moved in discrete steps in alternative implementations. For example, the motion can be continuous through the pattern without stopping. In such case, any of the following methods may be used to reduce motion-induced blur: 1) a short, powerful X-ray pulse may be used (like a strobe), 2) a time-domain integration sensor may be used, and/or 3) the motion of object 10 may be slow enough that motion-induced blur is minimized to an acceptable level. Further, while object 10 is described as being moved in the above example, in alternative implementations the sensors and/or X-ray source could be moved instead of or in addition to object 10 to achieve the desired scanning pattern.

The example described below in conjunction with FIGS. 8A-8D captures eight (8) views (i.e., 8 different angles of view) of a region for ease of explanation. Typical imaging systems for inspecting an object 10 (such as a circuit board assembly) often capture more than 8 views of each region of interest, and thus in such systems more multi-detector arrays may be added and/or an additional number of X-ray spot positions (on the anode 22) may be used to achieve a comprehensive set of angles of view of each region suitable for reconstructing the desired cross-sectional image(s) of each region. Thus, the present invention is not limited solely to the example system configuration (e.g., having 4 multi-detector arrays) of FIGS. 8A-8D, and it is not limited to the example operation (e.g., the lawnmower step pattern) described with FIGS. 8A-8D; but instead any other desired configurations of the imaging system (e.g., any number of multi-detector arrays) and operation (e.g., any step pattern) may be used in conjunction with embodiments of the present invention.

In the example of FIG. 8A, multi-detector arrays 31, 32, 33, and 34 (referred to collectively as multi-detector arrays 30) are used to first acquire radiographic image data for regions $10_A$, $10_B$, $10_C$, and $10_D$ of object (e.g., circuit board assembly) 10 at a first angle of view. That is, X-ray source 20, multi-detector arrays 30, and object 10 may be positioned relative to each other to enable imaging of regions $10_A$-$10_D$, wherein each of regions $10_A$-$10_D$ is imaged at a first angle of view. Of course, the "first" angle of view at which regions $10_A$-$10_D$ are simultaneously imaged may be different for each region, as can be seen from FIG. 8A. That is, the "first" angle of view for each of regions $10_A$-$10_D$ may be different. The radiographic image data acquired for each of regions $10_A$-$10_D$ for their respective first angle of view may be stored to data buffer 701.

Figure 8B:
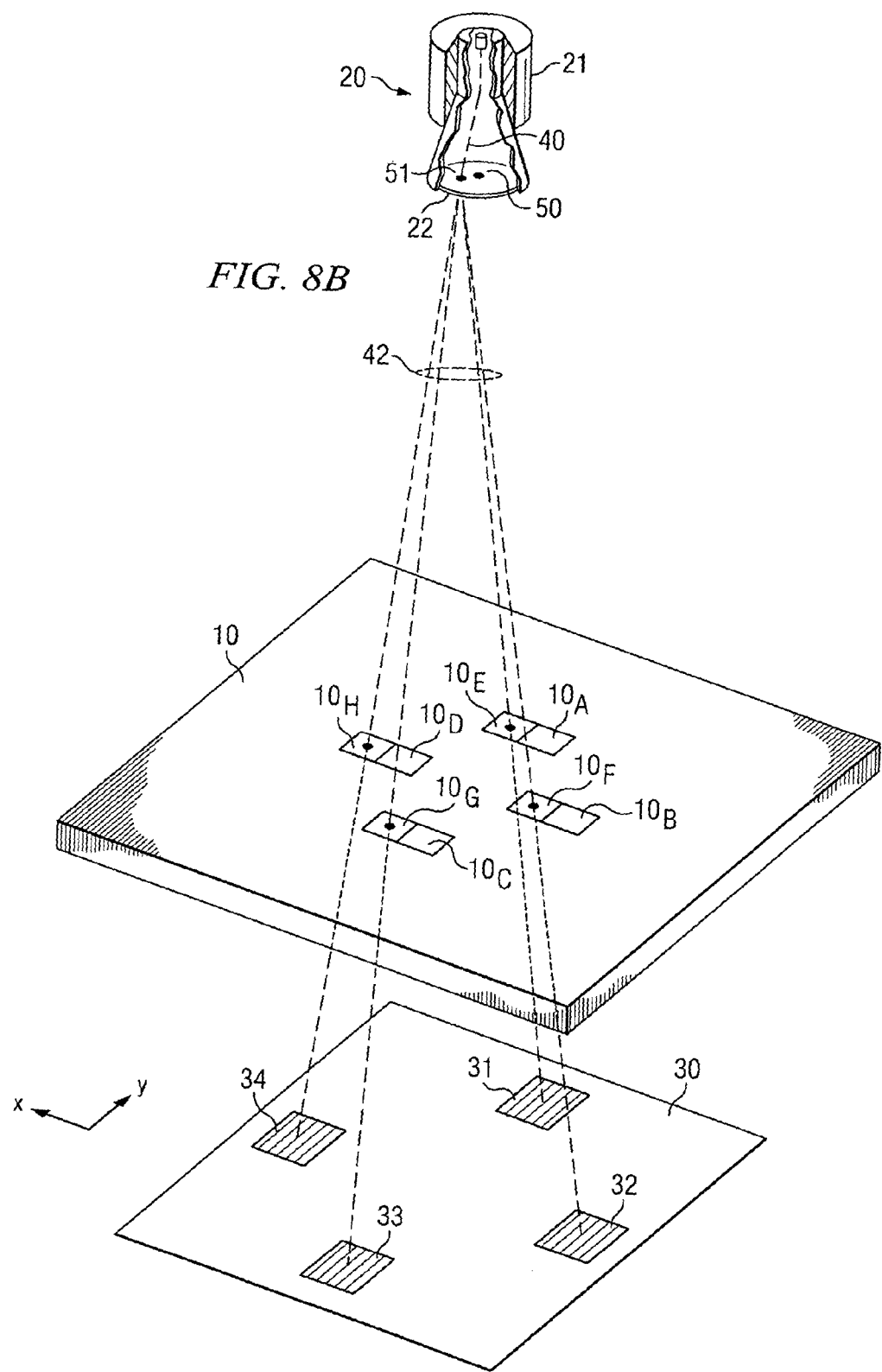

Thereafter, as shown in FIG. 8B, the radiographic imaging system may be used to acquire a radiographic image of regions $10_E$, $10_F$, $10_G$, and $10_H$ of object (e.g., circuit board assembly) 10 at a first angle of view. That is, X-ray source 20, multi-detector arrays 30, and object 10 may be positioned relative to each other to enable imaging of regions $10_E$-$10_H$, wherein each of regions $10_E$-$10_H$ is imaged at a first angle of view. For instance, beam 40 may be directed to spot 51 on anode 22 in FIG. 8B (rather than spot 50 as in FIG. 8A) such that X-ray beams 42 are directed toward object 10 from spot 51 as shown. Of course, the "first" angle of view at which regions $10_E$-$10_H$ are simultaneously imaged may be different for each region, as can be seen from FIG. 8B. That is, the "first" angle of view for each of regions $10_E$-$10_H$ may be different. Additionally, the "first" angle of view acquired for each of regions $10_E$-$10_H$ may not correspond to the first angle of view acquired for any of regions $10_A$-$10_D$ in FIG. 8A. The radiographic image data acquired for each of regions $10_E$-$10_H$ for their respective first angle of view may be stored to data buffer 701.

Figure 8C:
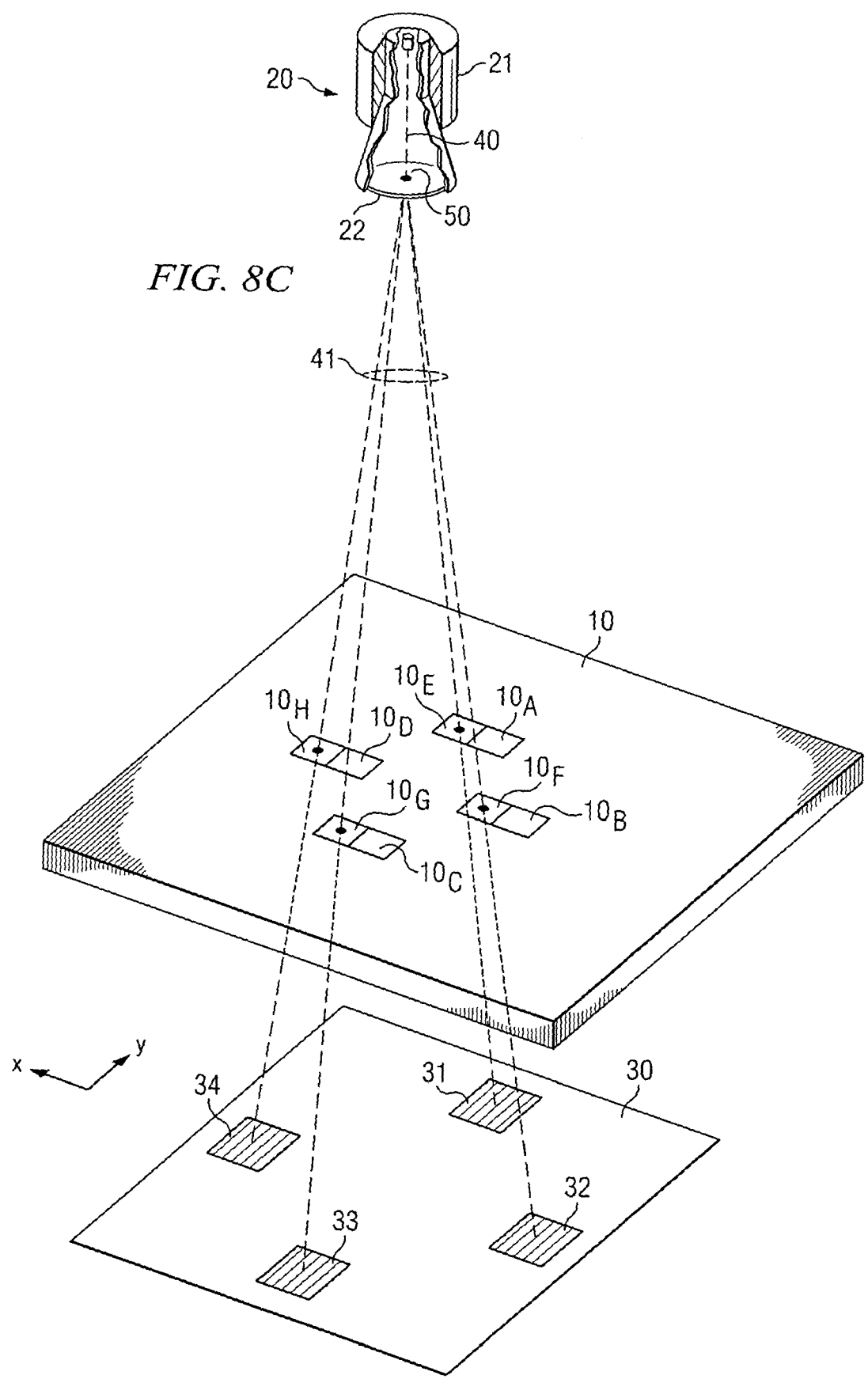
Figure 8D:
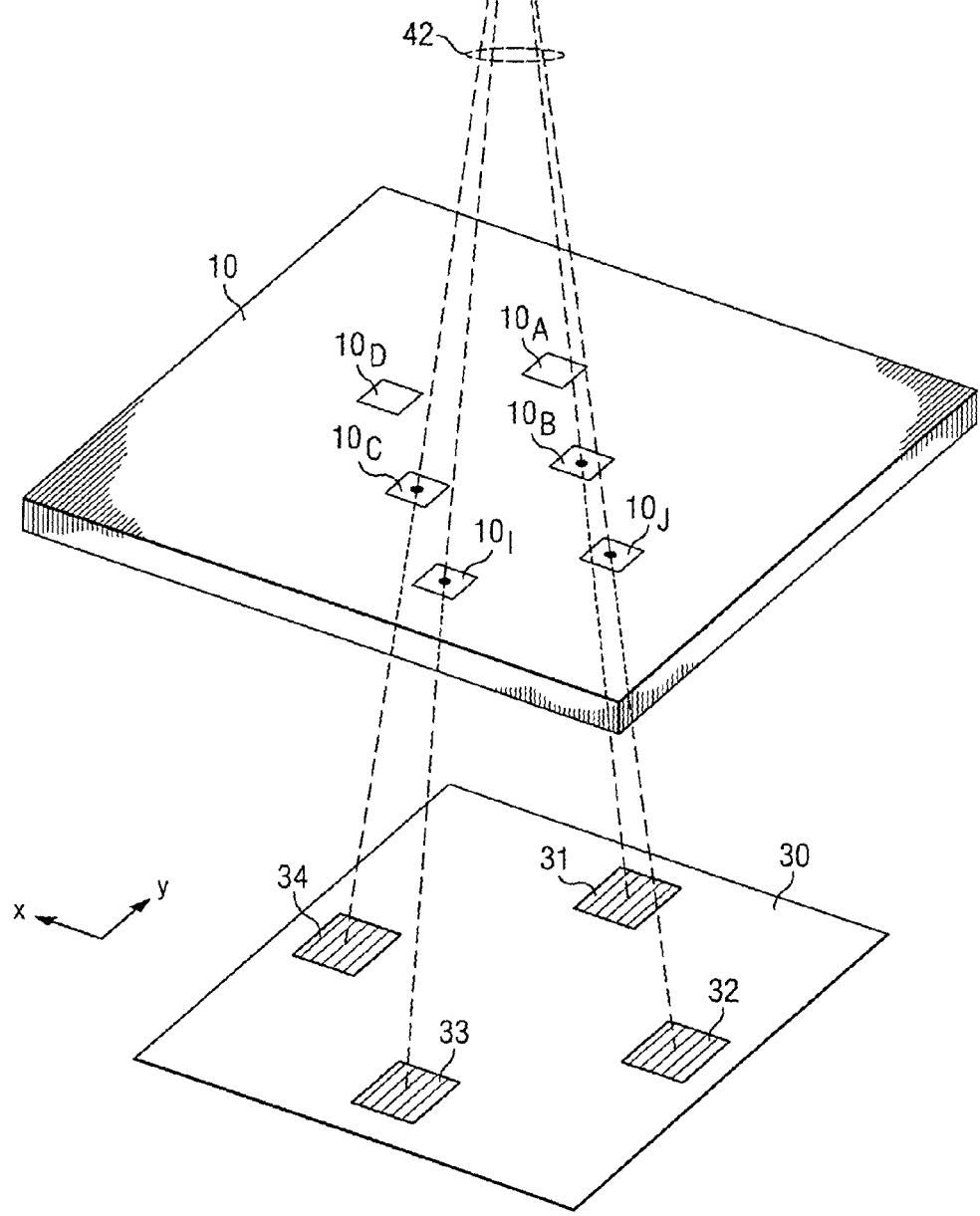

FIGS. 8C and 8D show an example of the next two opportunities to obtain at least one new view from the regions $10_A$-$10_H$ in this example of operation. After object 10 is positioned as in FIGS. 8A and 8B and imaged at that position, object 10 is moved to the right along the X-axis (in accordance with portion "A" of the lawnmower pattern shown in FIG. 8A) to a new position. In this example, object 10 is displaced so that the next contiguous four regions (along the X-axis) are viewed by the four multi-detector arrays 31-34 when the X-ray spot is in position 50 (e.g., the center of anode 22). This results in new views of regions $10_E$-$10_H$ with the X-ray spot position at 50, as shown in FIG. 8C. Thus, in FIG. 8C, object 10 is displaced one region to the right (along the X-axis) relative to its placement in FIGS. 8A and 8B.

Thus, after imaging object 10 at its position in FIGS. 8A and 8B, it may be stepped over to a new position along the X-axis (along portion "A" of the lawnmower pattern in FIG. 8A), resulting in a new orientation of such object 10 relative to the imaging system as shown in FIG. 8C. Accordingly, the radiographic imaging system may be used to acquire a radiographic image of regions $10_E$, $10_F$, $10_G$, and $10_H$ of object 10 at a second angle of view. For instance, beam 40 may be directed to spot 50 on anode 22 in FIG. 8C (as in FIG. 8A) such that X-ray beams 41 are directed toward object 10 from spot 50 as shown. Of course, the "second" angle of view at which regions $10_E$-$10_H$ are simultaneously imaged may be different for each region, as can be seen from FIG. 8C. The radiographic image data acquired for each of regions $10_E$-$10_H$ for their respective second angle of view may be stored to data buffer 701.

After the imaging of FIG. 8C, the next opportunity to obtain at least one new view from the regions $10_A$-$10_H$ in this example of operation is shown in FIG. 8D. Object 10 is displaced along the X-axis and the Y-axis to a new position (in accordance with portions "B", "C", "D", and "E" of the lawnmower pattern shown in FIG. 8A). More specifically, FIG. 8D shows an example position of object 10 as it is being stepped along portion "E" of the example lawnmower pattern of FIG. 8A. Thus, after imaging object 10 at its position in FIG. 8C, it may be stepped over to a new position along the X and Y axes (along portion "E" of the lawnmower pattern in FIG. 8A), resulting in a new orientation of such object 10 relative to the imaging system as shown in FIG. 8D. Accordingly, the radiographic imaging system may be used to acquire a radiographic image of regions $10_B$, $10_C$, $10_I$, and $10_J$ of object 10. Thus, a second angle of view is acquired for regions $10_B$ and $10_C$, and a first angle of view is acquired for regions $10_I$ and $10_J$ of object 10. That is, X-ray source 20, multi-detector arrays 30, and object 10 may be positioned relative to each other to enable imaging of regions $10_B$, $10_C$, $10_I$, and $10_J$. For instance, beam 40 may be directed to spot 51 on anode 22 in FIG. 8D such that X-ray beams 42 are directed toward object 10 from spot 51 as shown. Of course, the "second" angle of view of regions $10_B$ and $10_C$ and the "first" angle of view of regions $10_I$ and $10_J$ may be different for each region, as can be seen from FIG. 8D. The radiographic image data acquired for each of regions $10_B$, $10_C$, $10_I$, and $10_J$ for their respective angles of view may be stored to data buffer 701.

The above operation will continue (e.g., stepping object 10 along the lawnmower pattern and imaging regions thereof at points along such pattern) until all desired images of the regions of interest are acquired. For simplicity, it may be assumed that the entire object 10 (or a rectangular sub-region thereof) is imaged by moving in a lawnmower pattern in region-by-region steps. One may imagine that object 10 is tiled into regions corresponding to the volumes imaged by a multi-detector array (see e.g., FIG. 12). Further, it may be assumed that all multi-detector arrays are the same, and each region is imaged by each multi-detector array at each X-ray spot position in the above operational example. Accordingly, with four multi-detector arrays and two spot positions, as described in the example of FIGS. 8A-8D, this results in a total of eight (8) distinct angles of view for each region, which may be processed for reconstructing cross-sectional image(s) of each region. As mentioned above, typical imaging systems for inspecting an object 10 often capture more than 8 views of each region of interest, and thus in such systems more multi-detector arrays may be added and/or an additional number of X-ray spot positions (on the anode 22) may be used to achieve a comprehensive set of angles of view of each region suitable for reconstructing the desired cross-sectional image(s) of each region.

Figure 9:
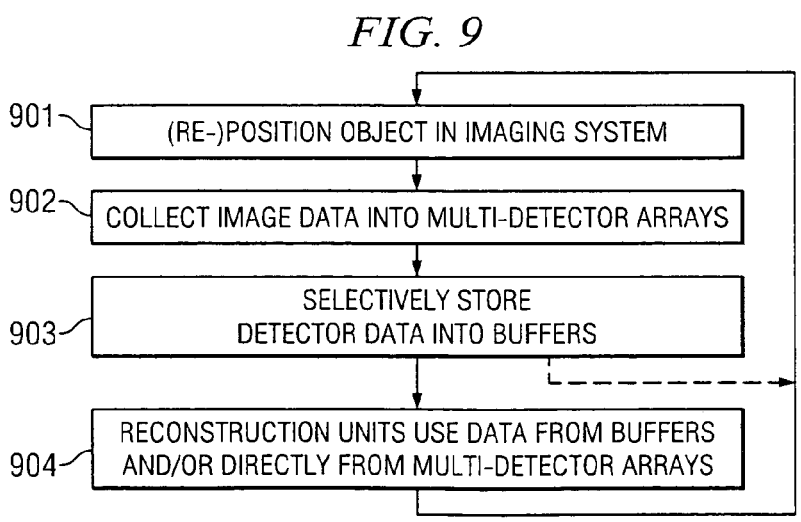
FIG. 9 shows an example operational flow diagram of a preferred embodiment of the present invention.

An example operational flow of a preferred embodiment of the present invention is shown further in FIG. 9. As shown, the image reconstruction process begins in operational block 901 in which an object 10 under inspection is positioned in a radiographic imaging system for imaging at least a first region (e.g., regions $10_A$, $10_B$, $10_C$, and $10_D$ in the example of FIG. 8A) thereof at a first angle of view. In operational block 902, radiographic image data is acquired by the radiographic imaging system's detector arrays (and frame buffers if so implemented) 30. In operational block 903, the acquired radiographic image data may be selectively stored to data buffer 701. For instance, as described further below, in certain embodiments, scheduler 702 may manage the radiographic image data such that some data is communicated directly to the image reconstruction unit 703 after being acquired by the multi-detector arrays 30, whereas certain other radiographic image data may first be stored to buffer 701. Thereafter, as shown by the dashed line, operation may return to operational block 901 to effectively re-position object 10 and/or the X-ray source 20 and/or multi-detector arrays 30 for acquiring further images of regions of object 10. In operational block 904, reconstruction unit(s) 703 use data from buffer 701 and/or directly from multi-detector arrays 30 to reconstruct desired cross-sectional image(s) of a region of object 10. As described further below, scheduler 702 preferably manages buffer 701 such that when sufficient data is accumulated therein for a region the data is transmitted to reconstruction processor 703. Thereafter, operation may return to block 901 for further acquisition of radiographic images of regions of object 10. As described further below, in certain embodiments, the imaging, buffering, and reconstruction processes may be performed in parallel with proper synchronization (e.g., as pipelined operations).

FIG. 10 shows an example operational flow of one embodiment of the present invention in greater detail. As shown, the process starts in operational block 1001. In operational block 1002, the object 10 is positioned for imaging a first set of views thereof (e.g., for imaging views of one or more regions, such as regions $10_A$-$10_H$ in the example FIGS. 8A-8B). In operational block 1003, the X-ray spot of beam 40 is positioned to a first position on anode 22 (such as to position 50 or position 51 shown in FIGS. 8A and 8B, respectively). Image data is then captured for one or more regions at a first angle of view into multi-detector arrays/frame buffers 30 (e.g., captured by multi-detector arrays 31, 32, 33, and 34) at operational block 1004. For instance, in the example of FIG. 8A, image data is captured for regions $10_A$-$10_D$. At block 1005, the acquired radiographic image data is stored to buffer 701. As described further below, in certain embodiments scheduler 702 may manage the acquired radiographic image data such that not all of the data is first stored to buffer 701, but rather at least some of the acquired data may be communicated directly from multi-detector arrays/frame buffers 30 to reconstruction processor 703. Thus, in certain embodiments, storing the radiographic image data to buffer 701 in operational block 1005 may be dependent on scheduler 702.

In operational block 1006, a determination is made (e.g., by scheduler 702) whether sufficient radiographic image data is stored in buffer 701 for performing image reconstruction of one or more desired cross-sections of any region of interest (e.g., regions $10_A$-$10_H$ in the example of FIGS. 8A-8B). For instance, a determination may be made as to whether radiographic image data for a sufficient number of angles of view has been accumulated for any region of interest to enable reconstruction of desired cross-sectional image(s) of such region of interest. If sufficient radiographic image data has been acquired, then operation advances to block 1007 whereat the radiographic image data for such region of interest is transmitted to image reconstruction unit(s) 703 for reconstructing this region, and in operational block 1008, the associated resources (e.g., buffers) for storing the radiographic image data for this region of interest may be freed (e.g., so that it may be reused for storing newly captured radiographic image data). Otherwise, if it is determined in block 1006 that sufficient radiographic image data (e.g., from a sufficient number of angles of view) has not been accumulated for any region of interest, operation advances from block 1006 to block 1009.

At operational block 1009, a determination is made as to whether further views are needed for the desired cross-sectional images to be reconstructed. If further views are needed, then operation advances to block 1010 to determine whether an additional needed view can be obtained by moving the X-ray spot (e.g., by re-positioning the X-ray spot on anode 22). If an additional needed view can be obtained this manner, then the X-ray spot is deflected/re-positioned to the appropriate position on anode 22 in block 1011 to enable acquisition of an additional needed view, and operation returns to block 1004 to capture image data for one or more regions of interest from this view. If determined at block 1010 that an additional needed view cannot be obtained by moving the X-ray spot, then the object under inspection (e.g., object 10 in FIGS. 8A-8B) may be re-positioned (e.g., in accordance with a lawnmower or other step pattern) to enable the needed view(s) to be obtained. Operation then returns to block 1004 to capture image data for one or more regions of interest from this view.

Operation continues in the above manner until it is determined at block 1009 that no further views are needed for reconstruction of the desired cross-sectional image(s) of the regions of object 10 that are of interest. Once it is determined in operational block 1009 that no further views are needed for reconstruction of the desired cross-sectional image(s) of the regions of object 10 that are of interest, operation advances to block 1013 whereat any remaining data in buffer 701 is communicated to reconstruction unit(s) 703 for reconstruction processing, and the associated resources for storing that data (e.g., the buffers) may be freed in block 1014. The process then ends for the object under inspection in operational block 1015.

In view of the above, it should be recognized that in a preferred embodiment desired cross-sectional images of a first region of an object need not be fully reconstructed before radiographic image data is acquired for a second region thereof. For example, in certain embodiments, radiographic image data may be captured for regions $10_A$-$10_D$ simultaneously, and such data may be buffered until sufficient amount of data (e.g., radiographic image data from a sufficient number of views) is acquired for those regions, at which time the buffered data may be sent to reconstruction unit(s) 703 for processing to reconstruct the desired cross-sectional images of regions $10_A$-$10_D$.

It should be recognized that a preferred embodiment enables "out of bounds" data captured for a region by imaging system 401 to be stored for later use, rather than being discarded. That is, if when imaging a first region (e.g., region $10_A$ of FIG. 8A-8B), out of bounds data corresponding to a second region (e.g., region $10_E$ of FIG. 8B) is acquired, such out of bounds data may be stored to buffer 701 and used by image reconstruction unit 703 when appropriate. Such out of bounds data is traditionally treated as scrap and is therefore discarded. The amount of such out of bounds data that is captured, and therefore the benefits of trying to make use of it, may vary between different imaging system implementations.

Figure 11:
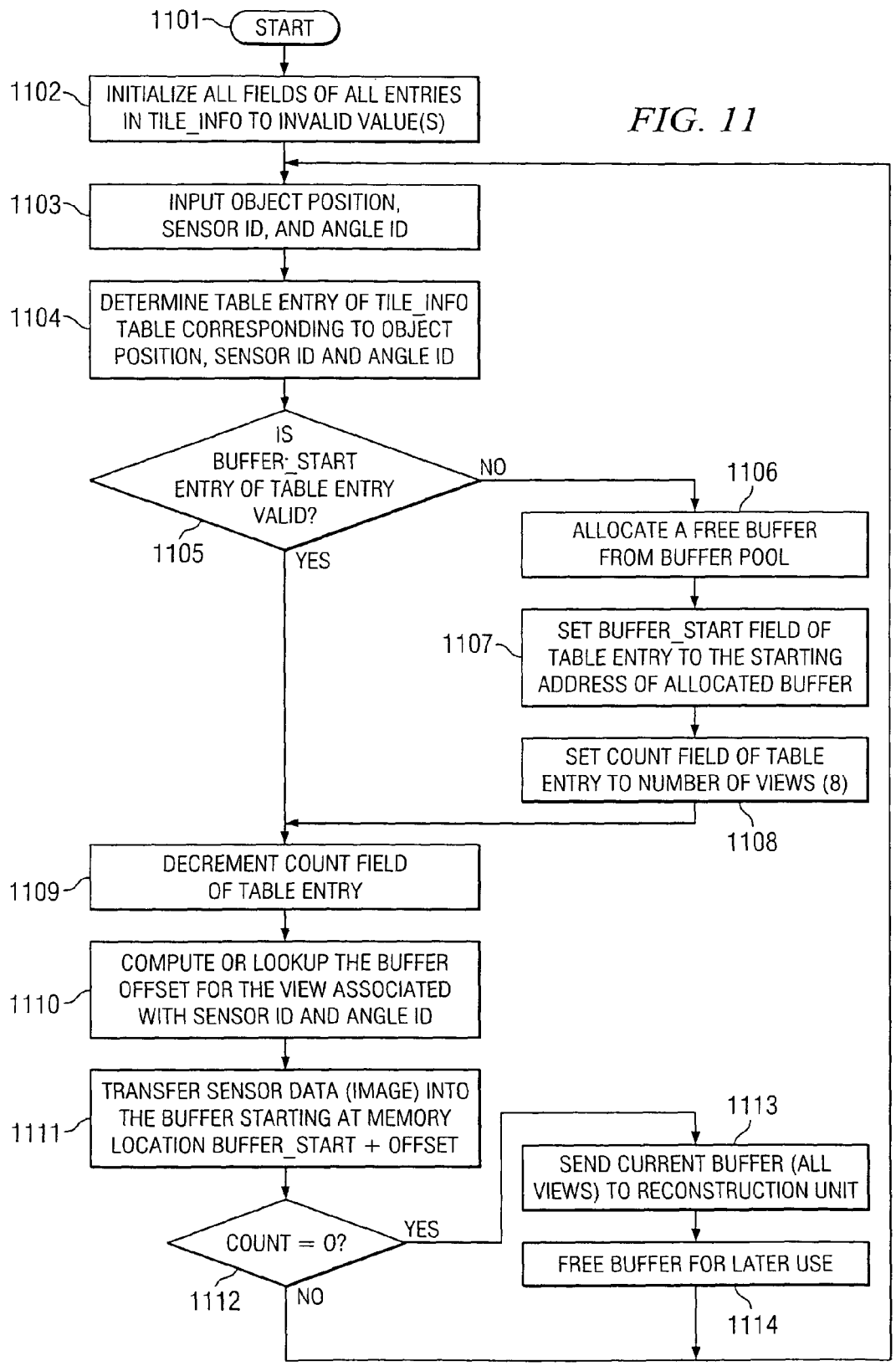
FIG. 11 shows an example operational flow diagram of a scheduler of a preferred embodiment.

According to a preferred embodiment of the present invention, a data access scheduler 702 is utilized in conjunction with buffer 701 to manage the radiographic image data acquired by the radiographic imaging system for efficient processing thereof by reconstruction processor unit 703. An example operational flow diagram of scheduler 702 of a preferred embodiment is shown in FIG. 11. Though the example flowchart of FIG. 11 is largely independent of the specific configuration of an imaging system, it is described below with reference to a specific configuration having four (4) like detector arrays and two X-ray spot positions, for consistency with the above example of FIGS. 8A-8D. As described with FIGS. 8A-8D above, this example configuration yields eight (8) distinct views for each region. The example flow of FIG. 11 is described with reference to FIGS. 12-14, which are each briefly described below.

FIG. 12 shows an example of an object 10 that is under inspection being logically organized into a plurality of tiles, wherein each tile corresponds to an imaged region of such object 10. That is, a tile pattern 1200 is logically overlaid on object 10, wherein each tile is identified by its tile index. It should be understood that object 10 may not actually be organized into such a tile pattern, but this example logical tile pattern of FIG. 12 is used to explain an example of imaging various regions of object 10, wherein each region of object 10 corresponds to a tile of tile pattern 1200.

As described above with the example of FIGS. 8A-8D, this example configuration includes four (4) multi-detector arrays 31-34 that each capture image data for each region (or tile) of object 10 at two distinct angles of view (e.g., from X-ray spots 50 and 51), thus yielding eight (8) total views of each region. FIG. 13 shows an example segment 1300 of a memory buffer (e.g., buffer 701 of FIG. 7) that stores the 8 views of a region. It is assumed in this example that the memory buffer is a contiguous region of memory (or appears to be contiguous to a system developer). The buffer includes a memory segment for each region of object 10 being imaged, such as memory segment 1300. For instance, memory segment 1300 may correspond to region $10_A$ of FIGS. 8A-8D (or, for example, tile 14 of FIG. 12). Buffer segment 1300 is further segmented into 8 contiguous sub-segments 1301-1308 that correspond to the 8 views of a region (e.g., region $10_A$) of object 10.

As shown in FIG. 13, each sub-segment 1301-1308 may further comprise storage of individual pixels of the corresponding view. For instance, a multi-detector array may capture a plurality of pixels of a region at a given view, and the captured pixels of the region at such view are stored to the corresponding sub-segment 1301-1308 of buffer segment 1300. A view from a particular multi-detector array/angle pair is stored in the same area 1301-1308 of the memory buffer. In the example of FIG. 13, sub-segment 1301 stores image data for a region (e.g., region $10_A$) of object 10 that is captured by multi-detector array 31 at a first angle of view (e.g., from X-ray spot 50), and sub-segment 1302 stores image data for the region (e.g., region $10_A$) of object 10 that is captured by multi-detector array 31 at a second angle of view (e.g., from X-ray spot 51). Sub-segment 1303 stores image data for the region (e.g., region $10_A$) of object 10 that is captured by multi-detector array 32 at a first angle of view (e.g., from X-ray spot 50), and sub-segment 1304 stores image data for the region (e.g., region $10_A$) of object 10 that is captured by multi-detector array 32 at a second angle of view (e.g., from X-ray spot 51). Sub-segment 1305 stores image data for the region (e.g., region $10_A$) of object 10 that is captured by multi-detector array 33 at a first angle of view (e.g., from X-ray spot 50), and sub-segment 1306 stores image data for the region (e.g., region $10_A$) of object 10 that is captured by multi-detector array 33 at a second angle of view (e.g., from X-ray spot 51). And, sub-segment 1307 stores image data for the region (e.g., region $10_A$) of object 10 that is captured by multi-detector array 34 at a first angle of view (e.g., from X-ray spot 50), and sub-segment 1308 stores image data for the region (e.g., region $10_A$) of object 10 that is captured by multi-detector array 34 at a second angle of view (e.g., from X-ray spot 51).

There will typically be many such buffers active or in use at any given time (e.g., for various different regions of object 10 that are of interest, such as regions $10_A$-$10_J$ in FIGS. 8A-8D). As the buffer segments are filled and their contents transferred to a reconstruction unit, they may be released for later possible use (e.g., for storage of data for other regions of interest).

FIG. 14 shows an example table that may be used to keep track of which regions (e.g., tiles) of object 10 have buffers allocated and how many views have been stored in each buffer. The table is called the "TILE_INFO" table. Entry i of the table corresponds to tile i (or region i). Each entry has a COUNT field and a BUFFER_START field. The BUFFER_START field of the ith entry contains the memory address of the buffer assigned to tile i. If there is no buffer assigned, then the field contains an invalid address, such as −1. Initially, there are no buffers assigned and all of the BUFFER_START fields are assigned such an invalid address. The COUNT field of the ith entry contains the number of views that have been transferred to the buffer for the ith tile or region.

Returning now to the example operational flow of FIG. 11, the operation starts in operational block 1101, and in block 1102 all fields of all entries in the TILE_INFO table are initialized to invalid value(s). Thus, before beginning imaging of an object under inspection, all entries of the TILE_INFO table may be initialized to invalid value(s). During the imaging of the object under inspection, scheduler 702 may receive as input (e.g., from the imaging system), in operational block 1103, identification of the position of object 10, sensor identification (i.e., identification of the multi-detector array that captured the corresponding image data), and identification of the angle of view identification for captured image data. For instance, as image data is captured by one of the multi-detector sensor arrays, scheduler 702 may receive identification of the position of object 10 at which the image data was captured, identification of the multi-detector array that captured the image data, and identification of the angle of view at which the image data was captured.

In operational block 1104, scheduler 702 determines an entry of TILE_INFO table corresponding to the object position, multi-detector array, and angle of view identified for the captured image data. In operational block 1105, scheduler 702 determines whether the BUFFER_START entry of the determined TILE_INFO table entry is valid. If such BUFFER_START entry is not valid, operation advances to block 1106 whereat a free buffer from a buffer pool is allocated for storing image data for this region of object 10. For instance, a pool of buffers may be available in buffer 701, and upon a new region being imaged a buffer segment (e.g., segment 1300 of FIG. 13) may be allocated for such new region. In block 1107, the BUFFER_START field of the table entry is set to the starting address of the allocated buffer. In block 1108, the COUNT field of the table entry is set to a desired number of views to be acquired for the region (e.g., for processing by reconstruction unit(s) to reconstruct the desired cross-sectional image(s) of the region), which is 8 in the above examples of FIGS. 8A-8D and FIG. 13.

From operational block 1108, or if scheduler 702 determines in block 1105 that the BUFFER_START entry of the table entry is valid, operation advances to block 1109. At block 1109, the COUNT field of the table entry is decremented by 1 (because image data from a first multi-detector array at a first angle of view has been received). In operational block 1110, scheduler 702 looks up or computes the buffer offset for the view associated with the identified sensor and angle of view (e.g., to determine the appropriate sub-segment 1301-1308 of memory buffer segment 1300 to which the captured image data is to be stored). In operational block 1111, the captured image data is transferred from the multi-detector array into the buffer starting at memory location BUFFER_START+offset (i.e., to store the captured image data to the appropriate sub-segment 1301-1308 of segment 1300).

In operational block 1112, scheduler 702 determines whether the COUNT field of the table entry is 0. If not, then sufficient views for beginning processing of the image data for reconstructing cross-sectional image(s) have not been acquired, and so operation returns to block 1103 for further imaging of object 10. Once the COUNT field of the table entry is determined in block 1112 as being 0, operation advances to block 1113 whereat scheduler 702 sends the image data from the current buffer (e.g., image data from segment 1300 associated with a particular region of object 10) to reconstruction unit(s) 703. Thus, the COUNT field identifies whether image data for a target number of projections of a region of object 10 have been acquired, and once such target number of projections have been acquired, the corresponding image data may be processed for reconstructing the desired cross-sectional images of the region. In block 1114, scheduler 702 may free buffer 1300 (i.e., the buffer from which image data was sent to reconstruction unit(s) 703 in operational block 1113) for later use.

Although the example flowchart of FIG. 11 implies a sequential algorithm, the performance can be improved by parallelizing the basic flowchart algorithm. For example, parallel program threads or circuits may, in certain implementations, be used to run the flowchart for each sensor. In such an implementation, the threads may synchronize any shared resources, such as the TILE_INFO table. Further, in certain implementations, a separate parallel thread may be implemented for sending buffer contents to the reconstruction unit(s).

When implemented via computer-executable instructions, various elements of embodiments of the present invention are in essence the software code defining the operations of such various elements. For instance, scheduler 702 may, in certain embodiments, be implemented as software code for managing the acquired radiographic image data for a reconstruction processor 703. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 15:
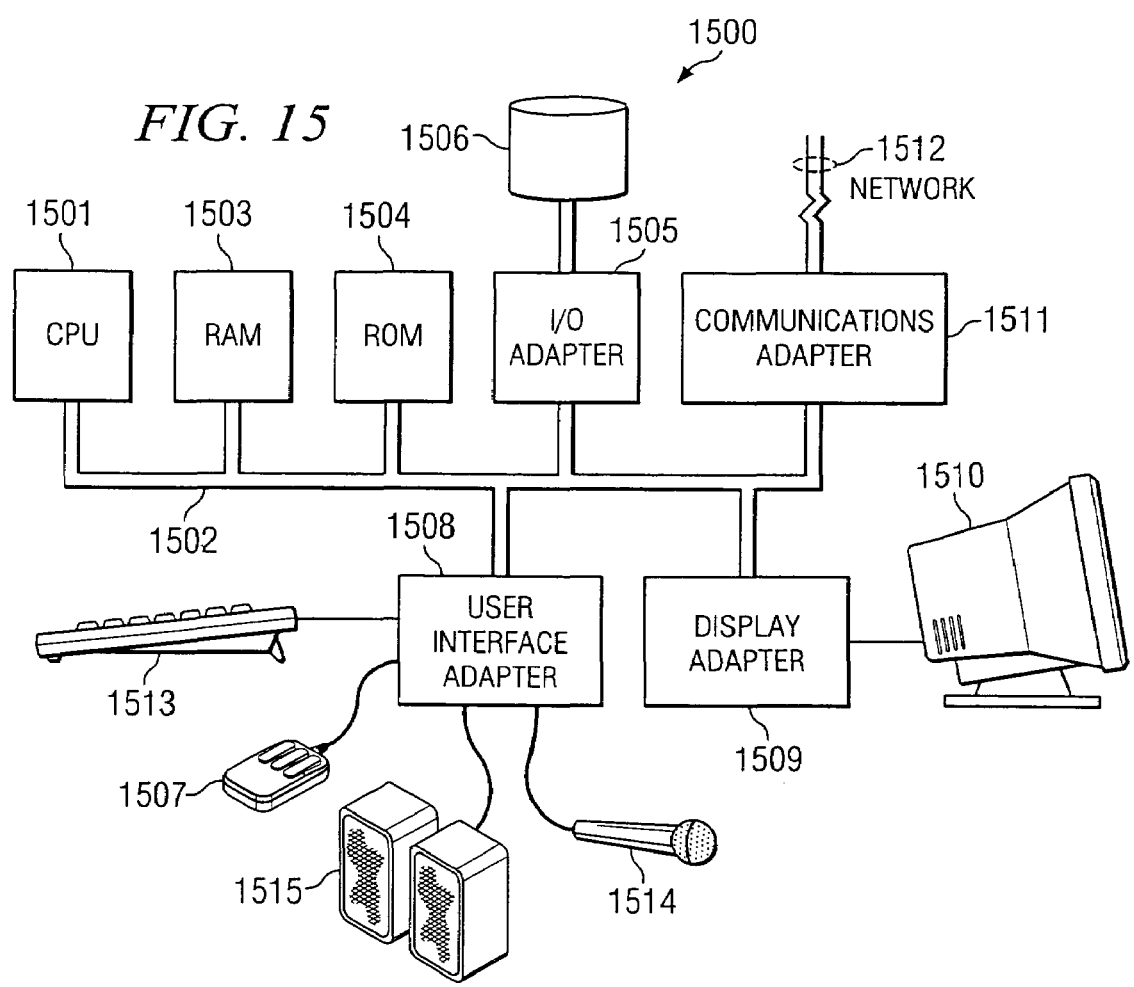
FIG. 15 shows an example computer system adapted according to embodiments of the present invention.

FIG. 15 illustrates an example computer system 1500 adapted according to embodiments of the present invention. That is, computer system 1500 comprises an example system on which embodiments of the present invention may be implemented. Central processing unit (CPU) 1501 is coupled to system bus 1502. CPU 1501 may be any general purpose CPU. Suitable processors include without limitation any processor from HEWLETT-PACKARD's ITANIUM family of processors, HEWLETT-PACKARD's PA-8500 processor, or INTEL's PENTIUM® 4 processor, as examples. However, the present invention is not restricted by the architecture of CPU 1501 as long as CPU 1501 supports the inventive operations as described herein. Further, in certain embodiments, computer system 1500 may comprise a plurality of CPUs 1501 (e.g., may be a multi-processor system, as is well known in the art). CPU 1501 may execute the various logical instructions according to embodiments of the present invention. For example, CPU 1501 may execute machine-level instructions according to the exemplary operational flows described above in conjunction with FIGS. 9, 10, and 11.

Computer system 1500 also preferably includes random access memory (RAM) 1503, which may be SRAM, DRAM, SDRAM, or the like. Computer system 1500 preferably includes read-only memory (ROM) 1504 which may be PROM, EPROM, EEPROM, or the like. RAM 1503 and ROM 1504 hold user and system data and programs, as is well known in the art.

Computer system 1500 also preferably includes input/output (I/O) adapter 1505, communications adapter 1511, user interface adapter 1508, and display adapter 1509. I/O adapter 1505, user interface adapter 1508, and/or communications adapter 1511 may, in certain embodiments, enable a user to interact with computer system 1500 in order to input information thereto.

I/O adapter 1505 preferably connects to storage device(s) 1506, such as one or more of hard drive, compact disc (CD) drive, floppy disk drive, tape drive, etc. to computer system 1500. The storage devices may be utilized when RAM 1503 is insufficient for the memory requirements associated with storing data for image reconstruction. Communications adapter 1511 is preferably adapted to couple computer system 1500 to network 1512. User interface adapter 1508 couples user input devices, such as keyboard 1513, pointing device 1507, and microphone 1514 and/or output devices, such as speaker(s) 1515 to computer system 1500. Display adapter 1509 is driven by CPU 1501 to control the display on display device 1510 to display information to a user such as, for example, a reconstructed cross-sectional image.

It shall be appreciated that the present invention is not limited to the architecture of system 1500. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

As described above, a preferred embodiment of the present invention implements digital memory buffers 701 within image reconstruction system 401 to hold sensor data. Multiple buffers 701 can be used for a given multi-detector array in certain implementations. This allows image views of regions to be acquired non-consecutively and multiple regions to be imaged simultaneously. Reconstruction of desired cross-sectional images can proceed as appropriate data becomes available (e.g., as sufficient radiographic image data is captured), thus freeing up buffers 701 for reuse and facilitating efficient use of the reconstruction unit(s) 703.

When the imaging system geometry, operating parameters and resources are known in advance, schedules of data access can be pre-determined and utilized by the control program (e.g., scheduler 702). Thus, in accordance with certain embodiments, acquired image data can be placed in pre-determined buffers 701 at pre-determined times (e.g., in a pre-determined order), and used by one or more reconstruction units 703 at pre-determined times. For instance, the operations described herein for capturing image data and reconstructing desired cross-sectional images may, for example, be triggered by time and/or system configuration (e.g., position of the object under inspection). Such scheduling can be designed to assure that memory conflicts do not occur or are reduced. If needed, global clocks and/or event triggers can synchronize memory accesses across multiple reconstruction units 703 and other system components. These techniques allow efficient use of resources for high-performance applications.

As an example, a simple configuration of buffer 701 comprises a pool of buffers each of which can store data from various multi-detector arrays. Older data from a multi-detector array can be retained in one buffer while loading newer data from such multi-detector array into another buffer. Buffers are returned to the buffer pool after their contents have been used. That is, captured pixels are stored to buffers so that the multi-detector array can be used again without wiping out the previously captured data. In some systems it will be advantageous to have multiple independent buffer pools that operate independently in parallel. A key advantage of embodiments of the present invention is that they enable reuse of the imaging detector before the previous data captured by that imaging detector is processed.

In a preferred embodiment, scheduler 702 controls the reconstruction process according to the geometry of the inspection system and what kind of information is needed for reconstruction to make optimal use of buffers 701. When the scheduler 702 determines that data is usable in the reconstruction unit 703, it sends the data to the reconstruction unit 703.

In a preferred embodiment, collecting of image data, scheduling, and reconstruction are all performed in parallel. For instance, various operations are pipelined. For example, some reconstruction may be performed while capturing image data and/or re-positioning the object under inspection. Preferably, each unit is kept busy all the time. When the schedule to be implemented by scheduler 702 is being constructed, a designer will generally know how long it takes to do each step, so the schedule may be implemented to get each process scheduled to allow for very efficient processing. Such scheduling will depend on the geometry of the inspection system (imager) used, how the object is passed through the system, and possibly on what is being inspected.

Embodiments of the present invention provide several advantages over traditional incremental image reconstruction systems. For example, a preferred embodiment solves throughput and complexity problems that incremental region-by-region reconstruction leads to. Performance problems due to detector array reuse timing are also alleviated, thus enabling a high-performance design.

In a preferred embodiment, object motion (and/or multi-detector arrays and/or X-ray source motion) is not constrained to produce all angles of view of a region consecutively, which enables the imaging system's imaging of various angles of view of various regions of an object to be scheduled such that it is optimized for other criteria. As discussed previously, the constraint of orienting an object so that a particular region is viewed consecutively from sufficient positions for reconstruction is a significant factor in device complexity and throughput degradation in traditional incremental systems. If image buffers are used in the manner described above, the object can be moved smoothly along an appropriate path such that eventually all desired views are obtained. Views of one region can be processed immediately or be buffered, while views of other regions are buffered until a reconstruction unit 703 is available to consume them. At that time, buffered views can be processed for reconstruction while images of other regions are captured. Since the object under inspection can move smoothly and continuously (or nearly so) there is little or no stabilization time needed between moves, improving throughput. Of course, as described above with FIGS. 8A-8D, in certain embodiments a step pattern may be utilized in which the object under inspection is moved to various points along the step pattern at which its movement is halted and it is imaged while stationary.

In certain configurations, such as the example configuration shown in FIGS. 8A-8D, a plurality of multi-detector arrays and/or X-ray source positions can be used to take images of different regions simultaneously. Buffering facilitates use of a plurality of multi-detector arrays, together with multiple X-ray source positions, such that multiple views of a region or regions are produced simultaneously. If multiple views of one region are produced at once, one can be used immediately in the reconstruction process while others are held in buffers 701 and used in turn. Further, multiple regions of an object under inspection can be imaged at once, using some immediately and buffering others. Imaging multiple regions simultaneously can improve performance by decreasing motion needed within the imaging system 401 to achieve complete coverage of an object (or portions thereof that are of interest), and simplify using multiple reconstruction units simultaneously.

In some instances, more efficient use of sensors, and thus higher throughput, can be achieved by buffering image information falling outside a particular "field of view" (FOV) or "angle of view" (as it is also referred to herein) and reusing that information in the reconstruction of other regions. When taking an image of a FOV some fragmentary image information outside the targeted FOV may be produced due to the imaging system geometry. These stray image fragments are traditionally discarded, but with buffers 701 these datum can be saved and used as part of the information for reconstructing other regions. This can improve system efficiency.

Images of regions can be combined to create larger FOVs. Data from a plurality of imaging sensors can be combined into a larger "virtual" sensor to achieve a larger FOV. This can be done by buffering sensors and combining multiple sensor data when available.

In certain embodiments, more planes can be reconstructed for a region than natively supported by the reconstruction units. A 3D image is reconstructed by producing a series of reconstructed cross-sections, or planes, of a region. Since reconstruction units typically have a fixed amount of memory for planes, the number of planes that can be incrementally reconstructed is limited. However, if images are buffered they can be re-used for reconstruction of other planes. For example, say a reconstruction unit has resources to produce 5 planes from a set of images, but 10 planes are desired. The 10 planes can be constructed in two passes (in accordance with a schedule implemented by scheduler 702), each pass computing 5 planes. Parameters are adjusted between passes so that different planes are computed in each pass. The second pass is able to re-access the images used for reconstruction because they are saved in the buffers 701.

Another advantage of certain embodiments is that they may use multiple reconstruction units to simultaneously reconstruct different planes. For example, suppose a system has two reconstruction units, each of which can produce five reconstructed planes. Suppose eight buffered images are used to reconstruct a cross-sectional image of a region. One way to arrange the reconstruction that avoids memory access conflicts is to have each reconstruction unit access a different buffer at a given time. For example, if the buffers are named by the numbers one (1) through eight (8), the schedule for one reconstruction unit can access buffers in the order 1, 2, 3, 4, 5, 6, 7, 8 while the other unit simultaneously accesses the buffers in the order 2, 3, 4, 5, 6, 7, 8, 1. Details of particular system implementations, such as memory configuration and bus timing, may influence how such schemes are used.

It should be noted that it is not typically necessary to partition memory accesses at the granularity of image buffers, but doing so provides a convenient and simple technique to avoid memory access conflicts. However, if finer access granularity is desired, and if the system memory architecture and data access patterns support it, a schedule can be created for such finer access granularity.

Various other advantages of embodiments of the present invention will be recognized by those of ordinary skill in the art.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reconstructing cross-sectional images of a plurality of different regions of an object from captured radiographic image data, said method comprising:
   capturing, by a first multi-detector array, radiographic image data for a first region of the object under inspection;
   storing said captured radiographic image data for said first region to a data buffer;
   capturing, by a second multi-detector array, radiographic image data for a second different region of said object under inspection before processing said captured radiographic image data for said first region for reconstructing a cross-sectional image of said first region; and
   processing said captured radiographic image data for said first region and said captured radiographic image data for said second region to reconstruct at least one cross-sectional image of said first and second regions of said object.

2. The method of claim 1 further comprising:
   performing said processing of said captured radiographic image data for said first region and said captured radiographic image data for said second region in accordance with a pre-defined data access schedule to tomosynthetically reconstruct at least one cross-sectional image of said first and second regions of said object.

3. The method of claim 1 comprising:
   capturing said radiographic image data for said first region and said radiographic image data for said second region in parallel.

4. A method for reconstructing cross-sectional images of a plurality of different regions of an object from captured radiographic image data, said method comprising:
   capturing radiographic image data for a first region of an object under inspection at a first multi-detector array;
   storing said captured radiographic image data for said first region to a data buffer;
   capturing, at a second multi-detector array, radiographic image data for a second different region of said object under inspection before processing said captured radiographic image data for said first region for reconstructing a cross-sectional image of said first region;
   capturing said radiographic image data for said first region and said radiographic image data for said second region in parallel; and
   processing said captured radiographic image data for said first region and said captured radiographic image data for said second region to reconstruct at least one cross-sectional image of said first and second regions of said object.

5. The method of claim 1 wherein said capturing radiographic image data for said first region of the object under inspection comprises:
   capturing radiographic image data for said first region at a first angle of view.

6. A method for reconstructing cross-sectional images of a plurality of different regions of an object from captured radiographic image data, said method comprising:
   capturing, by a first multi-detector array, radiographic image data for a first region of an object under inspection, wherein said capturing radiographic image data for said first region of the object under inspection comprises capturing radiographic image data for said first region at a first angle of view;
   storing said captured radiographic image data for said first region to a data buffer;
   capturing, by a second multi-detector array, radiographic image data for a second different region of said object under inspection before processing said captured radiographic image data for said first region for reconstructing a cross-sectional image of said first region;
   processing said captured radiographic image data for said first region and said captured radiographic image data for said second region to reconstruct at least one cross-sectional image of said first and second regions of said object;
   determining whether a desired number of different angles of view of said first region are stored to said data buffer; and
   responsive to determining that said desired number of different angles of view of said first region are stored to said data buffer, triggering said processing of said radiographic image data of said first region to reconstruct said at least one cross-sectional image thereof.

7. The method of claim 1 further comprising:
   storing to said data buffer the captured radiographic image data for said second region of said object under inspection.

8. The method of claim 7 comprising:
   storing to said data buffer the captured radiographic image data for said second region of said object under inspection before processing said captured radiographic image data for said first region for reconstructing a cross-sectional image of said first region.

9. A system comprising:
an image capture system operable to capture radiographic image data at a plurality of different projections of an object under inspection, wherein said image capture system comprises a plurality of multi-detector arrays operable to simultaneously capture multiple ones of said plurality of different projections;
at least one image reconstruction processor operable to process captured radiographic image data for tomosynthetic reconstruction of cross-sectional images of the object under inspection; and
a data buffer to which captured radiographic image data from said image capture system is stored, wherein said data buffer comprises a plurality of segments, each for storing radiographic image data for a different projection of said object under inspection.

10. The system of claim 9 further comprising:
a scheduler that controls processing of the captured radiographic image data, wherein radiographic image data of multiple ones of said plurality of different projections are stored to said data buffer before any of said multiple ones of said plurality of different projections are processed by said at least one image reconstruction processor.

11. The system of claim 9 wherein said plurality of different projections comprises radiographic image data of a plurality of different regions of said object under inspection.

12. The system of claim 9 wherein said plurality of different projections comprises radiographic image data of at least one region of said object under inspection at a plurality of different angles of view.

13. A system comprising:
means for simultaneously capturing radiographic image data at a plurality of different projections of a plurality of regions of an object under inspection;
means for storing said captured radiographic image data of said plurality of different projections of said plurality of regions;
means for processing the captured radiographic image data to tomosynthetically reconstruct a cross-sectional image of said plurality of regions; and
means for determining whether captured radiographic image data for a target number of said different projections of at least a first one of said plurality of regions is stored to said means for storing, and if said target number of said different projections of said at least a first one of said plurality of regions is stored to said means for storing, triggering processing of said captured radiographic image data of said at least a first one of said plurality of regions by the processing means.

14. The system of claim 13 wherein said plurality of different projections comprises radiographic image data of said plurality of regions of said object under inspection at a plurality of different angles of view.

15. The system of claim 13 wherein said means for capturing radiographic image data comprises:
a plurality of multi-detector arrays operable to simultaneously capture multiple ones of said plurality of different projections.

16. The system of claim 13 wherein means for storing comprises a data buffer having a plurality of segments, each for storing radiographic image data for a different projection of said object under inspection.

17. A method comprising:
imaging, by a plurality of multi-detector arrays, a plurality of regions of an object under inspection at a plurality of different projections;
storing image data for at least a first projection of said plurality of regions to a first segment of a data buffer;
storing image data for at least a second projection of said plurality of regions to a second segment of said data buffer;
determining whether image data for a target number of different projections of at least a first one of said plurality of regions is stored to said data buffer; and
if determined that image data for said target number of different projections of said at least a first one of said plurality of regions is stored to said data buffer, triggering processing of said image data of said at least a first one of said plurality of regions for tomosynthetically reconstructing a cross-sectional image of said at least a first one of said plurality of regions.

18. The method of claim 17 wherein said imaging said at least one region plurality of regions of said object under inspection comprises:
capturing radiographic image data for multiple ones of said plurality of different projections concurrently.

19. The method of claim 18 comprising:
storing said captured radiographic image data for said multiple ones of said plurality of different projections to said data buffer.

20. The method of claim 17 wherein said imaging at said plurality of regions of said object under inspection at a plurality of different projections comprises:
capturing radiographic image data for said at least a first one of said plurality of regions at a first angle of view.

21. The method of claim 17 wherein said determining whether image data for a target number of different projections of at least a first one of said plurality of regions is stored to said data buffer comprises:
determining whether image data for a sufficient number of different projections for tomosynthetically reconstructing at least one desired cross-sectional image of said at least a first one of said plurality of regions is stored to said data buffer.

* * * * *

UNITED STATES PATENT AND TRADEMARK OFFICE
CERTIFICATE OF CORRECTION

| | |
|---|---|
| PATENT NO. | : 7,436,991 B2 |
| APPLICATION NO. | : 10/651378 |
| DATED | : October 14, 2008 |
| INVENTOR(S) | : Greenbaum et al. |

It is certified that error appears in the above-identified patent and that said Letters Patent is hereby corrected as shown below:

In column 34, line 40, in Claim 20, after "imaging" delete "at".

Signed and Sealed this

Twenty-fourth Day of February, 2009

JOHN DOLL
*Acting Director of the United States Patent and Trademark Office*